United States Patent
Bidner et al.

(10) Patent No.: US 10,471,803 B2
(45) Date of Patent: Nov. 12, 2019

(54) SYSTEMS AND METHODS FOR THERMAL BATTERY CONTROL

(71) Applicant: Ford Global Technologies, LLC, Dearborn, MI (US)

(72) Inventors: David Karl Bidner, Livonia, MI (US); W. Cary Cole, Livonia, MI (US); Phillip Bonkoski, Ann Arbor, MI (US); Sunil Katragadda, Canton, MI (US); Michael Levin, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 802 days.

(21) Appl. No.: 15/008,226

(22) Filed: Jan. 27, 2016

(65) Prior Publication Data

US 2017/0210196 A1    Jul. 27, 2017

(51) Int. Cl.
| | | |
|---|---|---|
| *B60H 1/00* | (2006.01) | |
| *B60H 1/22* | (2006.01) | |
| *F28D 17/00* | (2006.01) | |
| *F28D 19/00* | (2006.01) | |
| *F28D 20/00* | (2006.01) | |

(52) U.S. Cl.
CPC ......... *B60H 1/00492* (2013.01); *B60H 1/004* (2013.01); *B60H 1/00885* (2013.01); *B60H 2001/2237* (2013.01); *F28D 17/00* (2013.01); *F28D 19/00* (2013.01); *F28D 20/00* (2013.01)

(58) Field of Classification Search
CPC ............... B60H 1/004; B60H 1/00492; B60H 1/00885; B60H 2001/2237; F28D 17/00; F28D 19/00; F28D 20/00

USPC ............... 165/4, 10, 104.16, 104.14, 104.15, 165/104.17, 104.21, 185, 901, 902
See application file for complete search history.

(56) References Cited

U.S. PATENT DOCUMENTS

| | | | | |
|---|---|---|---|---|
| 4,466,478 A | * | 8/1984 | Carlsson | C09K 5/063 165/10 |
| 4,535,837 A | * | 8/1985 | Ishii | F28D 20/025 126/618 |
| 5,085,790 A | | 2/1992 | Hormansdorfer | |
| 5,269,145 A | * | 12/1993 | Krause | C09K 5/063 60/659 |
| 5,445,213 A | * | 8/1995 | Im | F25D 16/00 165/10 |
| 5,765,511 A | * | 6/1998 | Schatz | B60H 1/00492 123/41.14 |
| 6,105,659 A | * | 8/2000 | Pocol | B60H 1/00478 165/10 |

(Continued)

*Primary Examiner* — Keith M Raymond
*Assistant Examiner* — Gustavo A Hincapie Serna
(74) *Attorney, Agent, or Firm* — Geoffrey Brumbaugh; McCoy Russell LLP

(57) ABSTRACT

Methods and system for operating a thermal storage device of a vehicle system are provided. In one example, a method comprises estimating a temperature of a thermal battery after the battery and coolant included therein have reached thermal equilibrium, and determining a state of charge of the battery based on the estimated temperature and one or more chemical properties of two phase change materials included within the battery. Specifically, the thermal battery may include two phase change materials with different melting points for providing thermal energy to warm coolant in a vehicle coolant system.

5 Claims, 10 Drawing Sheets

(56) References Cited

U.S. PATENT DOCUMENTS

| | | | | |
|---|---|---|---|---|
| 6,708,512 B2* | 3/2004 | Kitamura | ............... | B60H 1/005 62/227 |
| 7,859,845 B2* | 12/2010 | Ullman | ................... | F28D 9/005 165/104.33 |
| 8,201,615 B2* | 6/2012 | Soukhojak | ............. | C09K 5/063 165/10 |
| 8,584,734 B2 | 11/2013 | Shimozono | | |
| 8,800,502 B2* | 8/2014 | Choi | ...................... | F01P 11/00 123/198 D |
| 9,080,796 B2* | 7/2015 | Shaikh | .................... | F25B 27/00 |
| 9,140,500 B2* | 9/2015 | Goto | ......................... | F02G 5/00 |
| 9,784,509 B2* | 10/2017 | Al-Hallaj | ............... | F28D 20/021 |
| 10,001,327 B2* | 6/2018 | Fuse | ......................... | C09K 5/02 |
| 10,309,364 B2* | 6/2019 | Gu | ............................ | F01N 5/02 |
| 2001/0028791 A1* | 10/2001 | Salyer | ................... | F24H 7/0433 392/341 |
| 2004/0154784 A1 | 8/2004 | Pause | | |
| 2004/0159119 A1* | 8/2004 | Hu | ......................... | B64D 13/00 62/435 |
| 2005/0121187 A1* | 6/2005 | Chan | ....................... | F28D 17/00 165/300 |
| 2007/0141420 A1* | 6/2007 | Voss | ................... | H01M 8/04052 429/435 |
| 2008/0003491 A1* | 1/2008 | Yahnker | .................. | B25F 5/008 429/62 |
| 2010/0257870 A1* | 10/2010 | Suzuki | ............... | B60H 1/00478 62/3.2 |
| 2010/0273041 A1* | 10/2010 | Lawall | ................ | H01M 2/1072 429/120 |
| 2012/0227926 A1* | 9/2012 | Field | ...................... | F24D 11/003 165/10 |
| 2014/0079978 A1 | 3/2014 | Al-Hallaj et al. | | |
| 2014/0102662 A1 | 4/2014 | Grama et al. | | |
| 2014/0158340 A1* | 6/2014 | Dixler | ...................... | F28F 27/00 165/287 |
| 2014/0374058 A1* | 12/2014 | Greiner | .............. | B60H 1/00492 165/52 |
| 2015/0144304 A1* | 5/2015 | Schneider | ............... | B22D 41/01 165/104.17 |
| 2015/0152775 A1* | 6/2015 | Ando | ...................... | F01P 7/165 165/287 |
| 2015/0233617 A1* | 8/2015 | Chou | .................... | F25B 39/028 62/190 |
| 2015/0241137 A1* | 8/2015 | France | ................. | F28D 20/021 126/619 |
| 2016/0195340 A1* | 7/2016 | Bissell | .................. | F28D 20/021 165/10 |

* cited by examiner

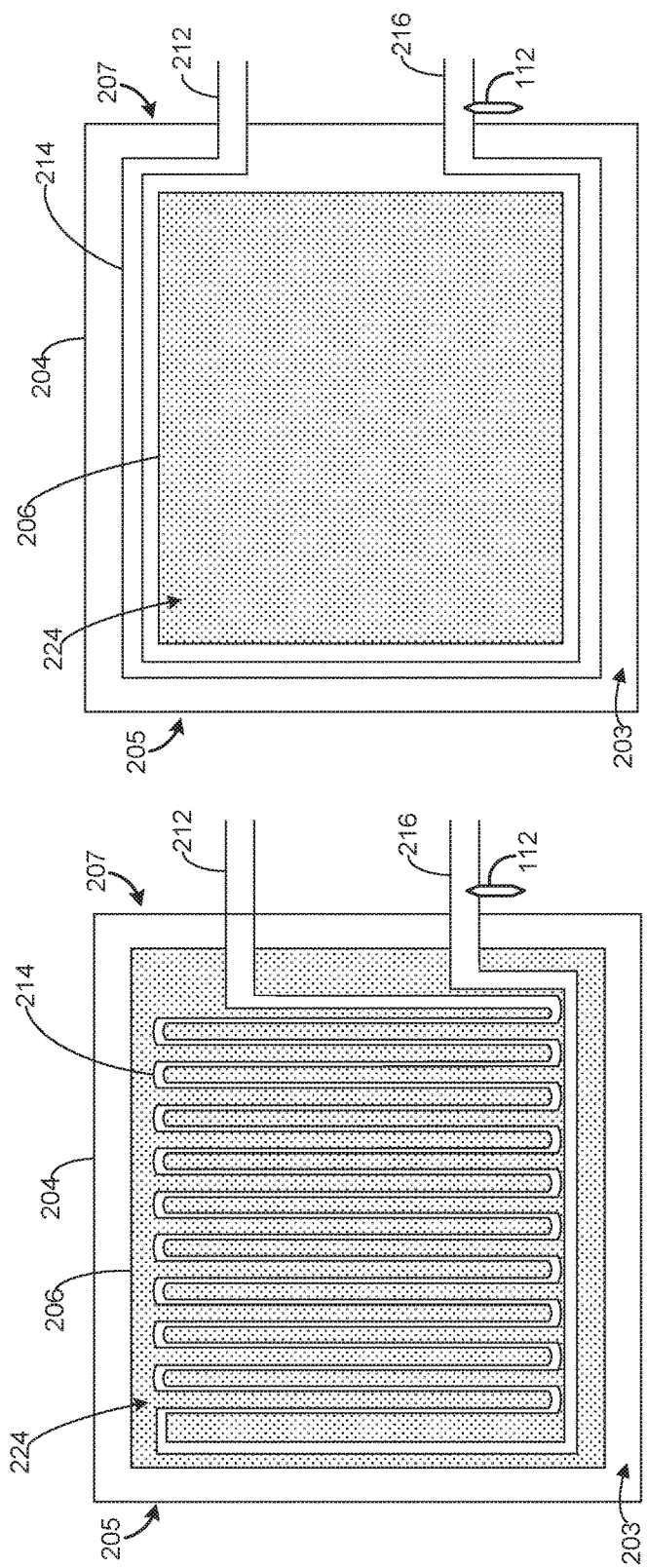

SYSTEMS AND METHODS FOR THERMAL BATTERY CONTROL

BACKGROUND AND SUMMARY

To enhance warming of various vehicle system components, thermal energy storage devices have been developed to store thermal energy produced by the vehicle system for later use. These thermal storage devices typically include a phase change material (PCM) that may store a significant amount of thermal energy as latent heat at the phase change temperature of the PCM. In one example approach disclosed in US 2004/0154784, phase change materials such as paraffin wax may be included in the interior of a vehicle to conserve energy while providing heat to the passenger compartment.

However, the inventors herein have recognized potential issues with such systems. Specifically, estimates of the state of charge of such thermal storage devices may be significantly reduced at the phase change temperature of the PCM in systems including only one type of PCM. Because of the latent heat stored in the PCM at its phase change temperature, it may be difficult to estimate the state of charge of the PCM when the PCM is transitioning between phases at its phase change temperature. Further, even in thermal storage devices including more than one PCM, such as the device disclosed in US 2014/0079978, the accuracy of estimates of the state of charge may be reduced when the temperature of coolant exiting the thermal storage device is different than the temperature of the thermal storage device.

For example, the temperature of the coolant exiting the thermal storage device may be different than the temperature of the thermal storage device when the coolant is not warmed to the temperature of the thermal storage device. This may occur when the coolant entering the thermal storage device is significantly colder than the thermal storage device, such that the thermal storage device cannot warm the coolant fast enough to bring it to thermal equilibrium with the thermal storage device before the coolant exits the thermal storage device. Thus, the coolant may not remain in the thermal storage device for long enough to reach thermal equilibrium with the thermal storage device. As such, the temperature of the coolant exiting the thermal storage device may not reflect the actual temperature of the thermal storage device. Therefore, when estimating the state of charge of the battery based on the temperature of coolant exiting the battery, the accuracy of such estimates may be reduced.

As one example, the issues described above may be addressed by a method comprising estimating a temperature of a thermal battery after the battery and coolant included therein have reached thermal equilibrium, and determining a state of charge of the battery based on the estimated temperature and one or more chemical properties of phase change material included in the thermal battery. The temperature of the thermal battery may be estimated based on outputs from a temperature sensor coupled to a coolant outlet of the battery, where the sensor may be configured to measure a temperature of coolant exiting the battery.

In another example, a method for an engine cooling system may comprise stopping coolant flow through a thermal storage device comprising two phase change materials with different melting points for a duration, resuming coolant flow through the thermal storage device after the duration and estimating a temperature of coolant exiting the thermal storage device based on outputs from a temperature sensor positioned proximate a coolant outlet of the device, and calculating a state of charge of the device based on the estimated coolant temperature and one or more chemical properties of the phase change materials. Additionally, the duration may comprise an amount of time for coolant included within the device and internal components of the device including the phase change materials, to reach thermal equilibrium, and where the duration may be calculated based on a most recent coolant temperature measurement and a most recent state of charge estimate of the battery.

In yet another example, a thermal battery system may comprise a thermal storage device including a first phase change material having a first phase change temperature and a second phase change material having a second, different phase change temperature. The thermal battery system may further comprise a coolant valve adjustable between a first position and a second position to selectively couple the thermal storage device to an engine coolant circuit and regulate an amount of coolant circulating through the thermal storage device. Additionally, the thermal battery system may comprise a temperature sensor for estimating a temperature of the device, and a controller with non-transitory computer readable instructions for: estimating a temperature of the device when coolant within the device has stopped for more than a threshold duration, and determining a state of charge of the battery system based on the estimated temperature and one or more chemical properties of the phase change materials. In some examples, the first and second phase change materials may be combined together in a mixture. However, in other examples, the first and second phase change materials may be separated from one another into distinct battery cells.

In this way, the accuracy of estimates of the state of charge of a thermal battery may be increased by temporarily stopping coolant flow through the thermal battery until the battery, its internal components, and coolant included therein, have reached thermal equilibrium. By resuming coolant flow after the coolant and battery have reached thermal equilibrium, and measuring coolant temperature of coolant exiting the battery that is at the temperature of the thermally equilibrated battery, a more direct and accurate measurement of the battery temperature and therefore state of charge may be obtained.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 2D shows a fourth example of the thermal storage device of FIG. 1B.

FIG. 2E shows a fifth example of the thermal storage device of FIG. 1B.

DETAILED DESCRIPTION

The following description relates to systems and methods for regulating the state of charge of a thermal battery. A thermal battery such as the thermal battery shown in FIGS. 2A-2E may be included in a vehicle system, such as the vehicle system shown in FIG. 1A, to store excess heat produced by the vehicle system for later use. For example, the thermal energy stored by the thermal battery may be used in a thermal management system, such as the thermal management system shown in FIG. 1B, to heat various vehicle components such as a vehicle engine, cabin compartment, etc. Specifically, heat from the thermal battery may be transferred to various vehicle components via coolant circulated through the thermal battery. However, as coolant flows through the thermal battery and captures heat from the thermal battery, the temperature and therefore state of charge of the battery may decrease. To charge the battery, excess heat produced by the vehicle system, such as heat from exhaust gasses, may be used to warm the thermal battery. FIG. 3 shows example control methods for regulating the state of charge of the battery. The state of charge of the battery may be inferred based on a temperature of the coolant as it exits the thermal battery.

However, under certain conditions, such as when coolant is flowing through the thermal battery and the coolant entering the thermal battery is at a significantly different temperature than the thermal battery, the coolant may not remain in the thermal battery long enough to reach thermal equilibrium with the battery. That is, although the temperature of the coolant may increase as it flows through the thermal battery, the temperature of the coolant may still remain lower than the temperature of the thermal battery after exiting the thermal battery.

Figure 4:
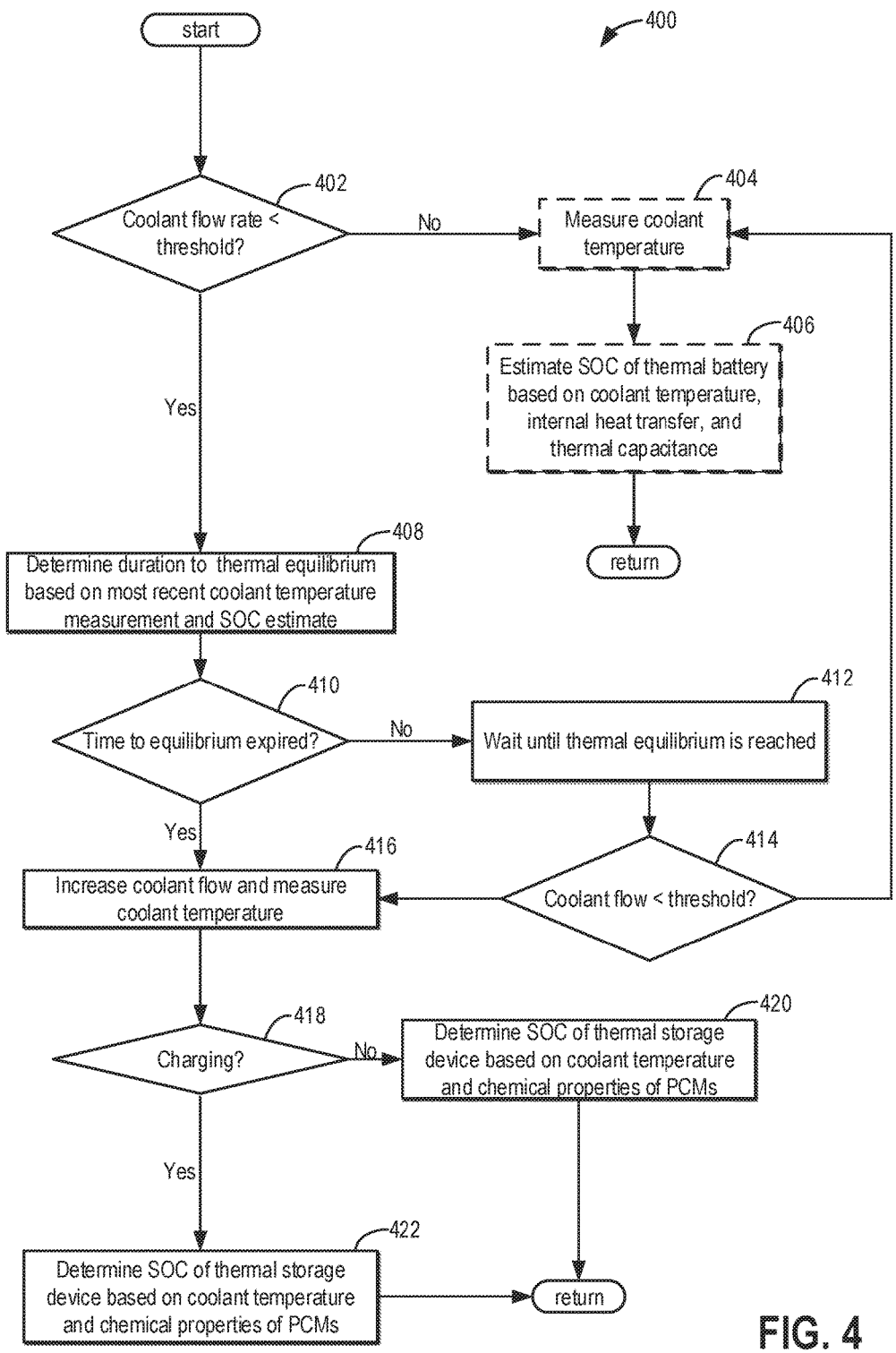
FIG. 4 shows a flow chart of a first example method for determining a state of charge of the thermal storage device.
Figure 7:
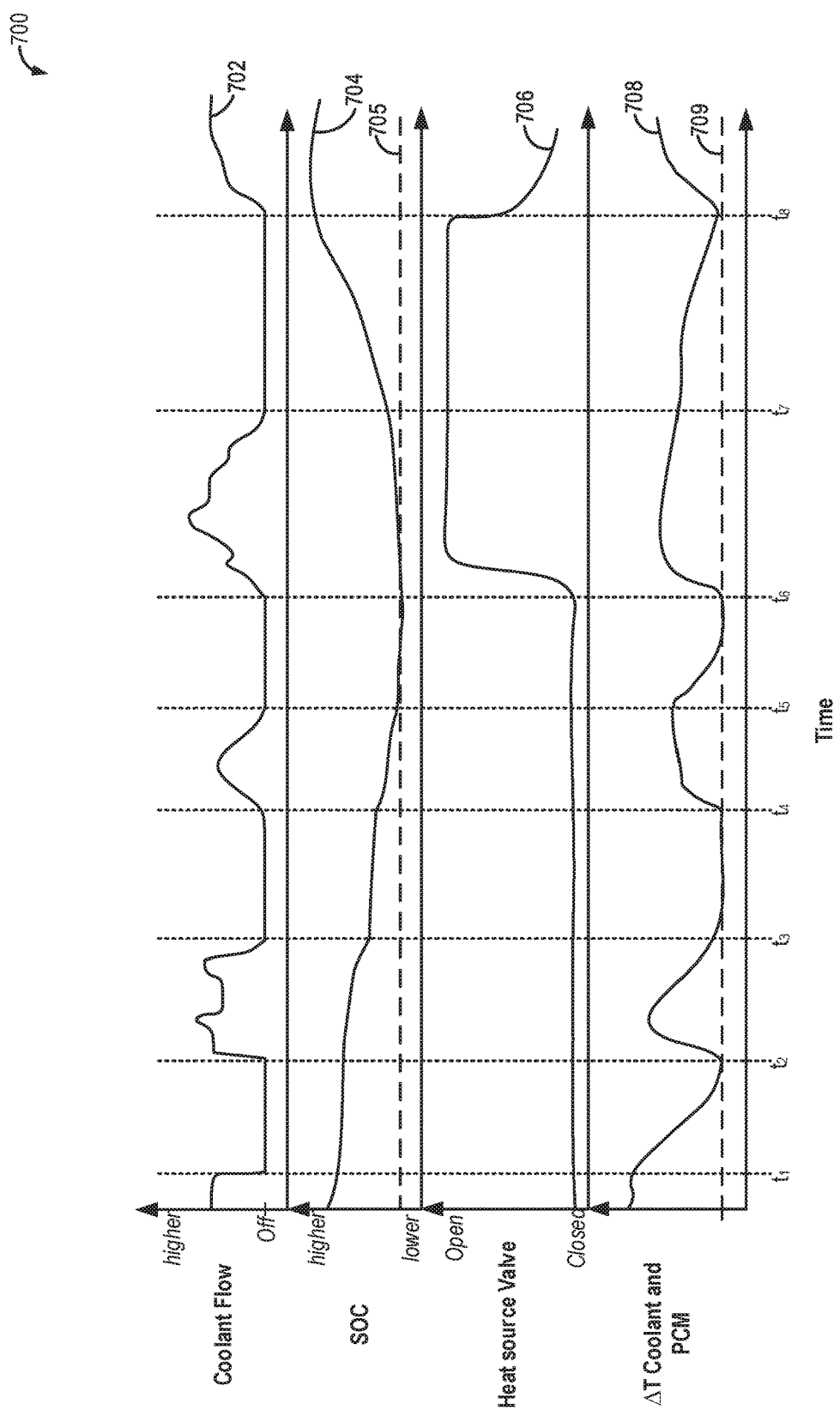
FIG. 7 shows a graph depicting changes in coolant flow through a thermal storage device based on engine operating conditions.

Thus, as shown in the example method of FIG. 4, the state of charge of the battery may be estimated when the coolant temperature reaches that of the thermal battery. In other examples, such as the example shown method shown in FIG. 5, coolant flow through the thermal battery may be temporarily stopped until the coolant temperature of coolant in the thermal battery reaches the temperature of the thermal battery. Coolant flow may then resume and the temperature of the coolant exiting the thermal battery may be measured to estimate the state of charge of the battery. Examples changes in coolant flow through the thermal battery are shown in FIG. 7.

Figure 1A:
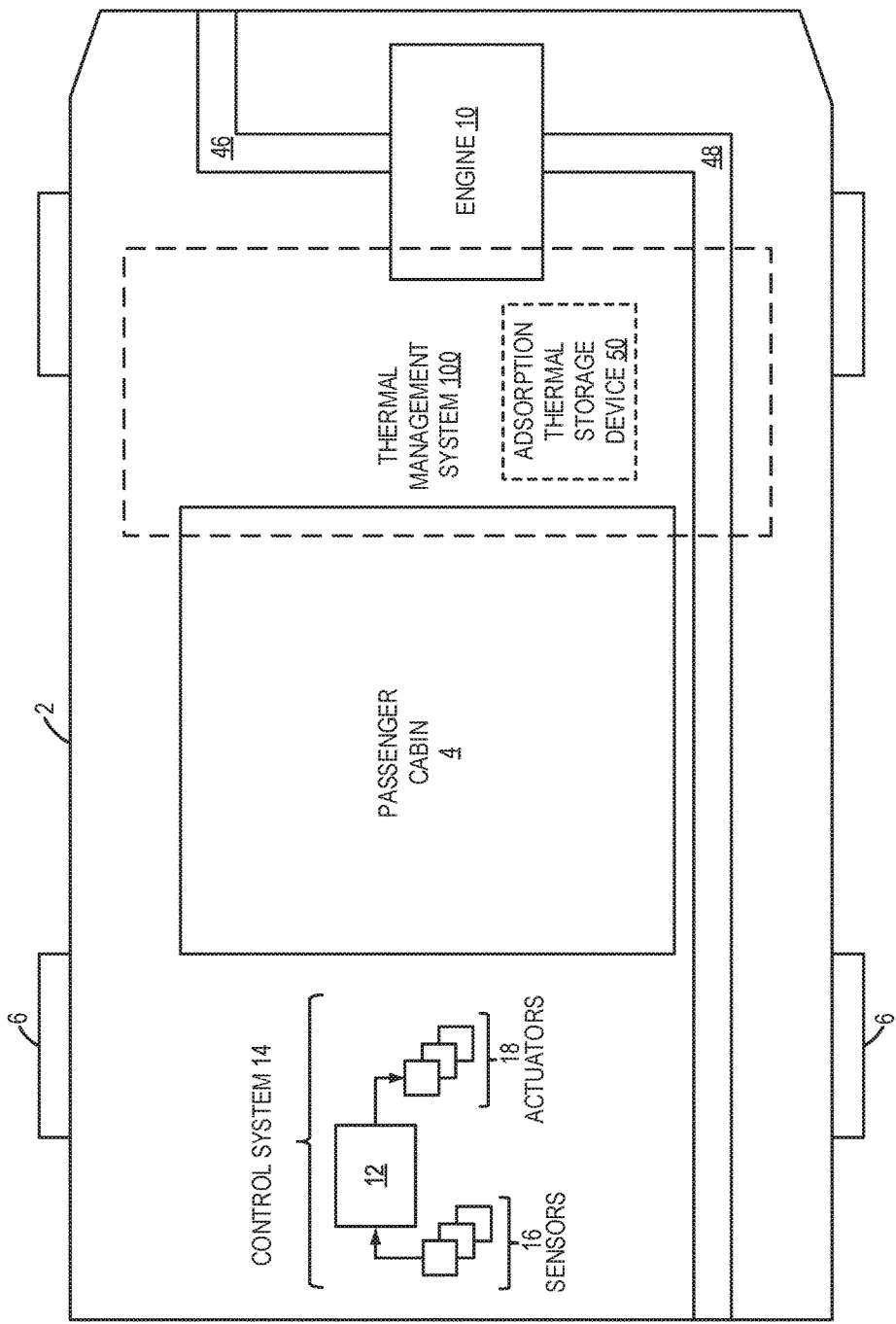
FIG. 1A shows a schematic of an example vehicle system including a thermal management system.

FIG. 1A shows an example embodiment of a motor vehicle 2 including a thermal management system 100 in accordance with the present disclosure. Vehicle 2 includes drive wheels 6, a passenger cabin 4, and an internal combustion engine 10. Internal combustion engine 10 includes at least one combustion chamber (not shown) which may receive intake air via an intake passage 46 and may exhaust combustion gases via exhaust passage 48. Engine 10 may be included in a motor vehicle such as a road automobile, among other types of vehicles. In some embodiments, engine 10 may be included in a propulsion system that also includes a battery driven electric motor, such as in a Hybrid Electric Vehicle (HEV) or a Plug-in Hybrid Electric Vehicle (PHEV). In some embodiments, thermal management system 100 may be included in an Electric Vehicle (EV) where engine 10 is omitted.

Figure 1B:
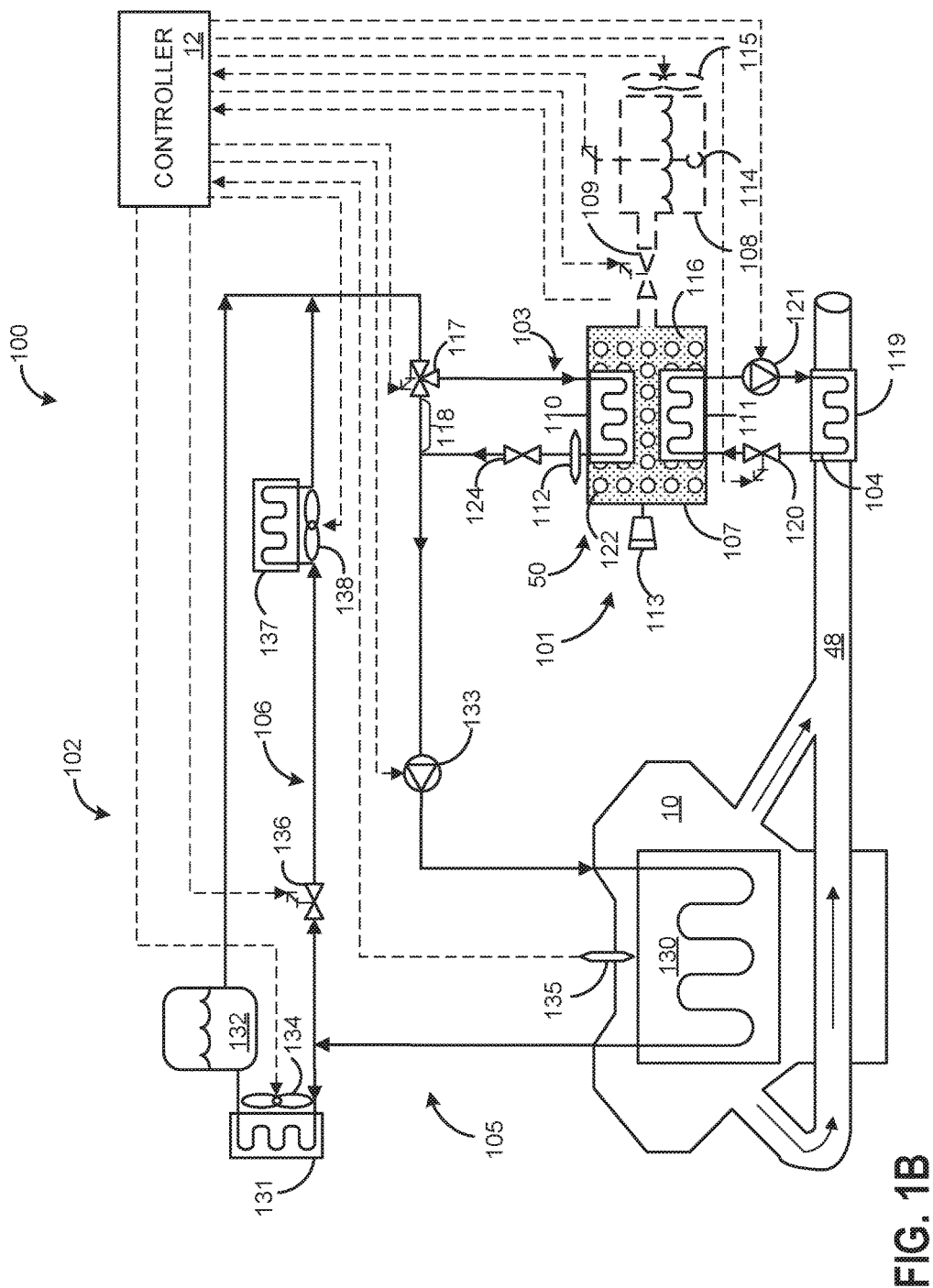
FIG. 1B shows a schematic of the thermal management system of FIG. 1A, including a thermal storage device.

Thermal management system 100 may include a thermal storage device 50 or thermal battery 50. Several embodiments of the thermal battery 50 are shown and described in detail below with reference to FIGS. 1B-2E. As shown in FIGS. 1A and 1B, thermal management system 100 may be coupled to engine 10, exhaust passage 48 and passenger cabin 4. The thermal storage device 50 may be configured to capture and store heat generated by engine 10 using one or more phase change materials (PCMs). Specifically, heat from exhaust gasses flowing through exhaust passage 48 may be transferred to the thermal storage device 50, and stored for later use. Heat from the thermal storage device 50 may then be used, for example, to provide heat to engine 10 at a cold start, to warm passenger cabin 4 in response to a passenger request to heat the cabin, etc. Additionally, in some examples, the thermal storage device 50 may be configured to generate heat via reversible exothermic and endothermic chemical reactions.

FIG. 1A further shows a control system 14 of vehicle 2. Control system 14 may be communicatively coupled to various components of engine 10 and thermal management system 100 to carry out the control routines and actions described herein. As shown in FIG. 1A, control system 14 may include an electronic digital controller 12. Controller 12 may be a microcomputer, including a microprocessor unit, input/output ports, an electronic storage medium for executable programs and calibration values, random access memory, keep alive memory, and a data bus.

As depicted, controller 12 may receive input from a plurality of sensors 16, which may include user inputs and/or sensors (such as transmission gear position, transmission clutch position, gas pedal input, brake input, transmission selector position, vehicle speed, engine speed, mass airflow through the engine, ambient temperature, intake air temperature, etc.), climate control system sensors (such as coolant temperature, antifreeze temperature, adsorbent temperature, fan speed, passenger compartment temperature, desired passenger compartment temperature, ambient humidity, etc.), and others.

Further, controller 12 may communicate with various actuators 18, which may include engine actuators (such as fuel injectors, an electronically controlled intake air throttle plate, spark plugs, transmission clutches, etc.), thermal management system actuators (such as air handling vents and/or diverter valves, valves controlling the flow of coolant, valves controlling flow of refrigerant, blower actuators, fan actuators, pump actuators, etc.), and others. In some examples, the storage medium may be programmed with computer readable data representing instructions executable by the processor for performing the methods described below as well as other variants that are anticipated but not specifically listed.

FIG. 1B depicts a schematic diagram of an example embodiment of thermal management system 100. Thermal management system 100 comprises two circuits, heat exchange circuit 101 and coolant circuit 102. Heat exchange circuit 101 includes thermal storage device 50, coolant heat exchange loop 103 and heat recovery loop 104. Coolant circuit 102 includes engine circuit 105 and heater circuit 106. Thermal energy from exhaust gasses flowing through exhaust passage 48 may be transferred to fluid in heat recovery loop 104. The heated fluid in heat recovery loop 104 may then be directed through the thermal storage device 50 to warm and/or charge the thermal storage device 50. Thus, the thermal storage device may capture and/or store thermal energy obtained from hot exhaust gasses. As such, energy that would have otherwise been lost to the atmosphere may be recycled and used in the thermal management system 100. In this way, the fuel efficiency of the system 100 may be increased. The thermal energy captured by the thermal storage device 50 may then be used to warm various vehicle components such as engine 10, heater core 137, passenger cabin (e.g., passenger cabin 4 shown in FIG. 1A). Specifically, thermal energy from the thermal storage device 50 may be transferred to various vehicle components via coolant, circulated through the thermal storage device 50. As the coolant flows through the thermal storage device 50, it is warmed, and the warmed coolant may then be pumped to the various vehicle components via coolant circuit 102.

Heat exchange circuit 101 may employ thermal storage device 50 to capture thermal energy from exhaust gasses flowing through exhaust passage 48 via heat recovery loop 104. Heat recovery loop 104 may include heat exchangers 111 and 119, valve 120 and pump 121. Valve 120 and pump 121 may be controlled by signals from controller 12. That is, controller 12 may send signals to valve 120 and/or pump 121 to adjust operation thereof. Specifically, the controller 12 may adjust an opening of the valve 120 and/or a speed of the pump 121 to control an amount of fluid flowing through the loop 104. In some examples, the valve 120 may be a continuously variable valve. However, in other examples, the valve 120 may be a binary valve. The pump 121 may be a variable speed pump. By increasing an opening of valve 120 and/or increasing a speed of pump 121, fluid flow in heat recovery loop 104 between heat exchanger 111 and heat exchanger 119 may be increased. In this way, thermal energy in exhaust passage 48 may be transferred to fluid flowing through heat exchanger 119. After being warmed by the exhaust gasses in exhaust passage 48, fluid in the loop 104 may flow through the thermal storage device 50, specifically through heat exchanger 111, and may transfer thermal energy to the thermal storage device 50.

Thus, heat from exhaust gasses may be transferred to coolant in coolant circuit 102 and various vehicle components, by first transferring heat from the exhaust gasses to the thermal storage device 50 via fluid circulating between the thermal storage device 50 and the exhaust passage 48. Heat in the thermal storage device 50 may then be transferred to the coolant in coolant circuit 102 by flowing the coolant in coolant circuit 102 through heat exchange loop 103 positioned within thermal storage device 50.

Heat exchange loop 103 includes valve 117, which may be adjusted by the controller 12 to regulate an amount of coolant flowing through the thermal storage device 50 and heat exchange loop 103. In some examples, the valve 117 may be a three way valve, where the valve may be adjusted to a first position, where substantially no coolant flows through heat exchange loop 103, and may instead only flow through coolant line 118 directly towards pump 133 without flowing through thermal storage device 50. The valve 117 may be further adjusted to a second position where substantially all of the coolant in coolant circuit 102 flows through the heat exchange loop 103 and thermal storage device 50, and substantially no coolant flows through coolant line 118. In some examples, the valve 117 may be a continuously variable valve and may be adjusted to any position between the first position and the second position.

By adjusting the valve between the first position and the second position, an amount of coolant flowing through the thermal storage device 50 may be adjusted. Specifically, the amount of coolant flowing through the heat exchange loop 103 relative to coolant line 118 may be increased by adjusting the valve 117 towards the second position, and away from the first position. In response to a demand for increased coolant temperature, such as during an engine cold start, controller 12 may send signals to the valve 117 to adjust towards the second position, to increase the amount of coolant flowing through the thermal storage device 50. As such, a temperature of the coolant may be increased by flowing the coolant through the thermal storage device 50. In this way, the thermal storage device 50 may provide an additional source of heat for the coolant, when desired.

In some examples, the heat exchange loop 103 may additionally include valve 124 which may regulate an amount of coolant flowing out of the thermal storage device 50, and back to the coolant circuit 102. Thus, the valve 124 may be adjusted to a closed first position where substantially no coolant flow there-through, and thus, coolant flow through the thermal storage device 50 and heat exchange loop 103 stops. Additionally, the valve 124 may be adjusted to a fully open second position, where coolant flows there-through. In some examples, the valve 124 may be a continuously variable valve and may be adjusted to any position between the first and second positions, to regulate an amount of coolant exiting the valve 124. Specifically, the controller 12 may send signals to the valve 124 to adjust the position of the valve. The amount of coolant flowing through the valve 124 may increase as an opening formed by the valve 124 increases with increasing deflection of the valve 124 towards the open second position and away from the closed first position.

After exiting the thermal storage device 50, coolant may be directed towards pump 133 due to the suction generated at an inlet of the pump 133. Thus, coolant may be pumped from one or more of coolant line 118 and heat exchange loop 103 to various vehicle components such as engine 10, by pump 133. More simply, pump 133, may circulate coolant through coolant circuit 102.

It should also be appreciated that in some examples, coolant in coolant circuit 102 may not be routed through the thermal storage device 50, and that a separate fluid flowing loop may be included in the thermal management system 100 to capture heat stored in thermal storage device 50. In such examples, a separate heat exchange loop, such as heat recovery loop 104 may be used to transfer heat from the thermal storage device 50 to the coolant in coolant circuit 102. Thus, fluid flowing through this separate heat exchange loop may be routed through the thermal storage device 50 to capture heat from the thermal storage device 50. An additional pump may be included in the heat exchange loop to pump the fluid through the thermal storage device 50. The fluid in this loop may then transfer heat from the thermal storage device 50 to coolant in the coolant circuit 102 via a heat exchanger, such as heat exchanger 119. As such, coolant in coolant circuit 102 may not pass through the thermal storage device 50, and may instead pass through a heat exchanger, where heat captured from the thermal storage device 50 by a fluid flowing in a separate heat exchange loop may be transferred to the coolant.

A temperature sensor 112 may be coupled to the heat exchange loop 103 for estimating a temperature of the thermal storage device 50. Specifically, the temperature sensor 112 may be coupled at a coolant outlet of the thermal storage device 50 where coolant leaves the thermal storage device 50. Thus, the temperature sensor 112 may be configured to measure a temperature of the coolant in heat exchange loop 103 as it exits the thermal storage device 50. Based on signals received from the temperature sensor 112, the controller 12 may infer a state of charge of the thermal storage device 50. However, in other examples, the temperature sensor 112 may be coupled directly to the thermal storage device 50 for measuring a temperature thereof. The state of charge of the thermal storage device 50 may be proportional to the temperature of the device 50. That is, the state of charge may increase with increasing temperatures of the device 50.

The thermal storage device 50 may include housing 107. Various insulating materials may be included within housing 107 to maintain the temperature of the thermal storage device 50. Further, the thermal storage device 50 includes phase change material (PCM) 116. In some examples, as shown below with reference to FIGS. 2D-2E, two distinct PSMs with different melting temperatures may combined to form a mixture in the thermal storage device 50. However, in other examples, as shown below with reference to FIGS. 2B-2C, the two PCMs with different melting temperatures may be separated from one another into distinct cells.

In some embodiments, as depicted in FIG. 1B, thermal storage device 50 may additionally be configured to generate thermal energy through chemical adsorption. In such examples, where the thermal storage device is capable of generating thermal energy, the thermal energy device 50 may include a plurality of adsorber cells 122, which may be filled with an adsorbent. The adsorbent may be a high energy medium density such as silica gel, zeolite, activated carbon, or other suitable adsorbents. The adsorbent may be formed into a crystalline structure within adsorber cells 122. Additionally, the thermal storage device 50 may include a fluid container 108, fluidically coupled to the adsorber cells 122 via electronic throttling valve 109. Electronic throttling valve 109 may be opened or closed in response to signals from controller 12. Fluid container 108 may contain an adsorbate that results in an exothermic reaction when combined with the adsorbent in adsorber cells 122. For example, in embodiments where the adsorber contains an adsorber such as zeolite, the fluid in fluid container 108 may be water, or an aqueous solution, such as ethylene glycol solution or propylene glycol solution. The fluid may also be a methanol or ammonia based solution. Upon opening of electronic throttling valve 109, fluid from fluid container 108 may enter adsorber 107, where the fluid may be adsorbed by the adsorbent.

Thermal storage device 50 may further include pressure relief valve 113. When included, fluid container 108 may further include fluid level sensor 114, and may be coupled to fan 115.

From the coolant line 118 and/or heat exchange loop 103, coolant may be pumped by pump 133 to one or more vehicle components such as engine 10. Pump 133 may be controlled by signals from controller 12. Thus, the controller 12 may send signals to the pump 133 to adjust a speed of the pump 133, and therefore an amount of coolant flowing through the coolant circuit 102. Specifically, the pump 133 may in some examples be a variable speed pump.

As depicted in the example of FIG. 1B, coolant may be pumped from one or more of coolant line 118 and/or heat exchange loop 103 to engine circuit 105. However, it should be appreciated that in other examples, coolant may be pumped to the engine circuit 105 before being pumped to the heat exchange loop 103. It should also be appreciated, that in some examples, coolant may be pumped directly from the thermal storage device 50 to various vehicle components such as heater core 137, and may bypass the engine 10. Thus, coolant warmed by the thermal storage device 50 may be routed directly to a vehicle component, such as a passenger cabin (e.g., passenger cabin 4 shown in FIG. 1A), to warm the vehicle component.

Engine circuit 105 includes, engine cooling jacket 130, radiator 131, and coolant reservoir 132. Radiator fan 134 may be coupled to radiator 131. A temperature sensor may be coupled to engine 10 or engine cooling jacket 130, such as thermocouple 135. In a scenario when the engine is cold (e.g., cold-start conditions), heat stored in thermal storage device 50 may be transferred to coolant engine circuit 105 via heat exchanger 110 through activation of pump 133 and the adjusting of the valve 117 to the second position. If the engine is overheated, coolant may be circulated by pump 133 through engine cooling jacket 130, with excess heat discharged through radiator 131 with the use of radiator fan 134. In such examples, it may not be desired to warm the coolant in coolant circuit 102, and as such valve 117 may be adjusted to the first position and thus, coolant may bypass the thermal storage device 50. Heat from engine 10 may also be used to charge and/or heat the thermal storage device 50 through activation of pump 121 and the opening of valve 120.

Heating circuit 106 includes valve 136 and heater core 137. A fan 138 may be coupled to heater core 137. A passenger may request heat for passenger cabin 4. In response to this request, controller 12 may signal valve 136 to open, thereby partially bypassing engine circuit 105. Coolant in engine circuit 105 may be circulated through heater loop 106 by activating pump 133. Heat from the coolant may then be transferred to heater core 137 and blown into passenger cabin 4 by activating fan 138. If the coolant in engine circuit 105 is insufficient to charge heater core 137, additional heat may be passed to coolant circuit 102 by adjusting valve 117 to the second position, and flowing coolant through the thermal storage device 50. More detailed methods for usage and control of thermal management system 100 are discussed below and with regards to FIGS. 3, 4, and 5.

FIGS. 2A-2E show example schematics of a thermal battery 202 that may be included in a vehicle system (e.g., motor vehicle 2 shown in FIG. 1A). Thus, the thermal battery 202 shown in FIGS. 2A-2E, may be the same or similar to thermal storage device 50 described above with reference to FIG. 1B. Further, FIGS. 2A-2E may be described together in the description herein. After being introduced in the description of one of the FIGS. 2A-2E, components of the battery 202 may not be reintroduced or described again. Thermal battery 202 may be included in a vehicle system to store heat produced by an engine (e.g., engine 10 shown in FIGS. 1A and 1B) of the vehicle system for later use in the vehicle system. Specifically, heat from the thermal battery 202 may be transferred to coolant of a coolant system (e.g., coolant circuit 102 shown in FIG. 1B) by flowing the coolant through the thermal battery 202. When the temperature of the coolant is less than the temperature of the thermal battery 202, heat may be transferred from the thermal battery 202 to the coolant flowing through the thermal battery 202, draining or discharging the battery 202. In the description herein, draining or discharging the battery may refer to the removal of heat or thermal energy from the battery 202. Similarly, charging the battery may refer to the increase of thermal energy of battery 202. To charge the battery 202, excess heat produced by the vehicle system, such as from the engine, may be transferred to the thermal battery 202, as explained above with reference to FIG. 1B.

Figure 2A:
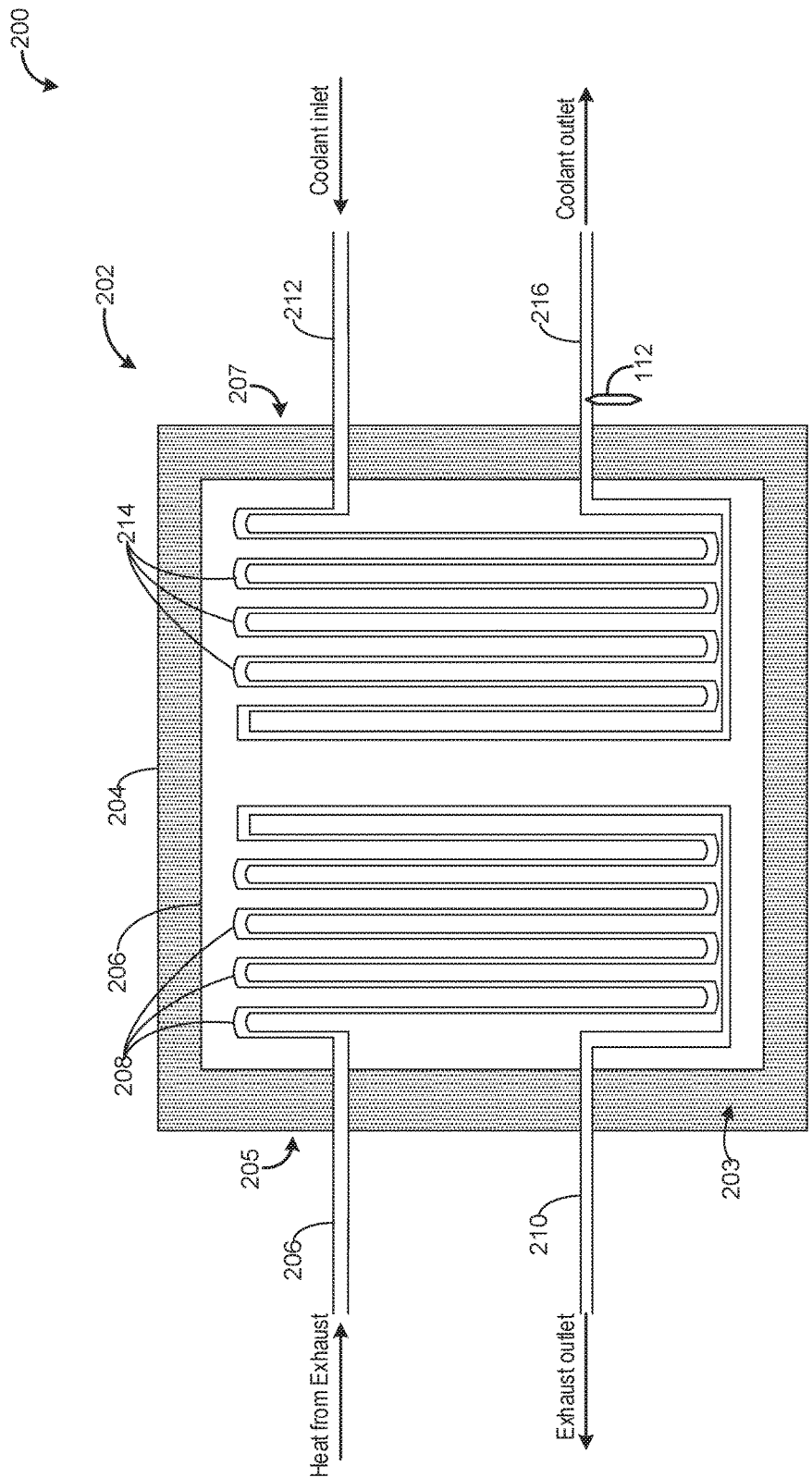
FIG. 2A shows a first example of the thermal storage device of FIG. 1B.
Figure 2C:
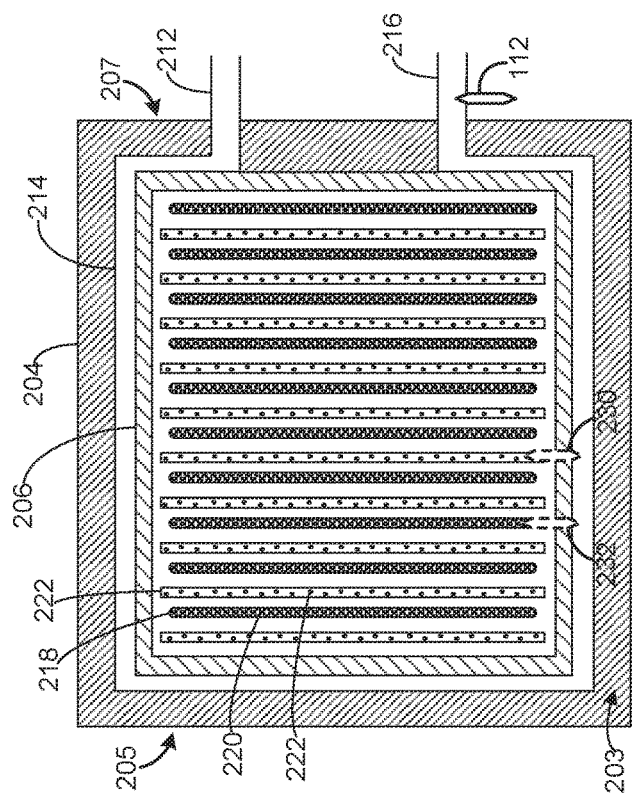
FIG. 2C shows a third example of the thermal storage device of FIG. 1B.

Focusing on FIG. 2A, it shows a schematic 200 of a first embodiment of the thermal battery 202. The thermal battery 202 may comprise a housing 204, within which components of the thermal battery 202 may be included. A heat exchange region 206 is included within the housing 204, and may include two different PCMs with different melting points. However, in other examples, more or less than two PCMs, each with different melting points may be included in the heat exchange region 206. In some examples, as shown below with reference to FIGS. 2B and 2C, the PCMs may be contained within distinct cell blocks, and may be separated from one another. However, in other examples as shown below with reference to FIGS. 2D and 2E, the PCMs may be combined to form a mixture in the heat exchange region 206.

One or more insulating layers, such as insulating layer 203, may be included between the housing 204 and the heat exchange region 206 to reduce heat transfer between the interior and exterior portions of the housing 204 and battery 202. Thus, the insulating layer 203 may reduce heat loss from the thermal battery 202 to the external environment. Although only one insulating layer is shown in FIG. 2A, it should be appreciated that more than one layer may be included. Further, the insulating layers may be constructed from any suitable insulating material. Each layer may be constructed from the same or different insulating material.

Heat from exhaust gasses flowing in an exhaust passage (e.g., exhaust passage 48 shown in FIGS. 1A and 1B) may be introduced to the thermal battery 202 via a heat source inlet tube 206. In some examples, as described above with reference to FIG. 1B, the heat from exhaust gasses may be transferred to the thermal battery 202 via a fluid. Thus, in some examples, a fluid at a higher temperature than the thermal battery 202, may flow through the heat source inlet tube 206 and into the thermal battery 202 to provide thermal energy (e.g., heat) to the thermal battery 202. However, it should be appreciated that in other examples exhaust gasses may be directly routed to the thermal battery 202 and introduced thereto through the heat source inlet tube 206. After flowing through the heat source inlet tube 206, fluids (e.g., liquids and/or gasses) may flow through a series of heat exchange tubes 208 positioned within the heat exchange region 206, where heat from the fluid may be transferred to the PCM in the heat exchange region 206. Thus, the PCM may absorb heat from the fluid flowing through the heat exchange tubes 208, assuming the fluid is at a higher temperature than the PCM. Fluid in the heat exchange tubes 208 may then exit the thermal battery 202 via a heat source outlet tube 210. Thus, the inlet tube 206 and outlet tube 210 may provide fluidic communication between exterior portions of the battery 202 and the heat exchange region 206.

Coolant from the coolant system may enter the thermal battery 202 via a coolant inlet tube 212. After flowing through the inlet tube 212, coolant may proceed through heat absorption tubes 214 positioned within the heat exchange region 206, where heat from the PCM in the heat exchange region 206 may be transferred to the coolant in the heat absorption tubes 214. Thus, coolant may absorb heat from the PCM, assuming the coolant is at a lower temperature than the PCM. Coolant in the heat absorption tubes 208 may then exit the thermal battery 202 via a coolant outlet tube 216. Thus, the inlet tube 212 and outlet tube 216 may provide fluidic communication between exterior portions of the battery 202 and the heat exchange region 206.

Although the inlet and outlet tubes 206 and 210 are shown in FIG. 2A to be positioned at and extending through the same side of the thermal battery 202, it should be appreciated that in other examples, the inlet and outlet tubes 206 and 210 may be positioned on different sides of the battery 202. For example, the inlet tube 206 may be positioned at and may extend through front end 205 of battery 202, and outlet tube 216 may be positioned at and extend through back end 207 and vice versa.

Similarly, the inlet and outlet tubes 212 and 216 although shown in FIG. 2A to be positioned and extending through the same side of the thermal battery 202, may in other examples be positioned on different sides of the battery 202. For example, the inlet tube 212 may be positioned at and extend through front end 205 and outlet tube 216 may be positioned at and extend through back end 207, and vice versa.

Heat source inlet tube 206, heat source outlet tube 210, and heat exchange tubes 208 are included in the thermal battery 202. However, for the purposes of simplicity, the tubes 206, 208, and 210 are omitted from the embodiments of the thermal battery 202 shown below with reference to FIGS. 2B-2E. Thus, it is important to note that despite being omitted from FIGS. 2B-2E, tubes 206, 208, and 210 are still included in the embodiments of the thermal battery 202 shown in FIGS. 2B-2E. Thus, the battery 202 may be heated/charged by flowing heated fluid through the heat exchange tubes 208. Further, the battery 202 may be cooled/discharged by flowing coolant through the heat absorption tubes 214.

Turning now to FIGS. 2B-2E, they show different embodiments of the thermal battery 202. In the embodiments of the thermal battery 202 shown in FIGS. 2B and 2C, the two different PCMs may be encapsulated in distinct cells. However, in FIGS. 2D and 2E, the two different PCMs are shown mixed together in the heat exchange region 206.

Figure 2B:
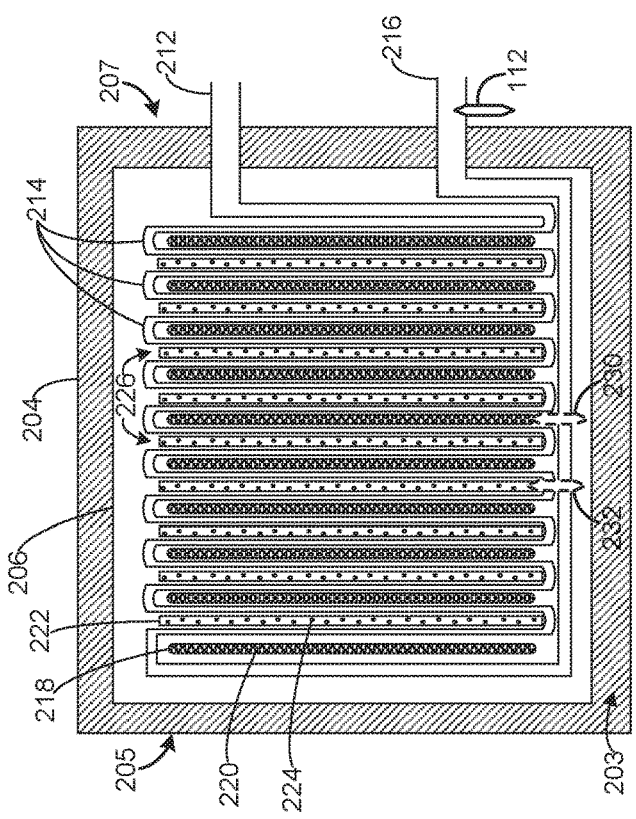
FIG. 2B shows a second example of the thermal storage device of FIG. 1B.
Figure 3:
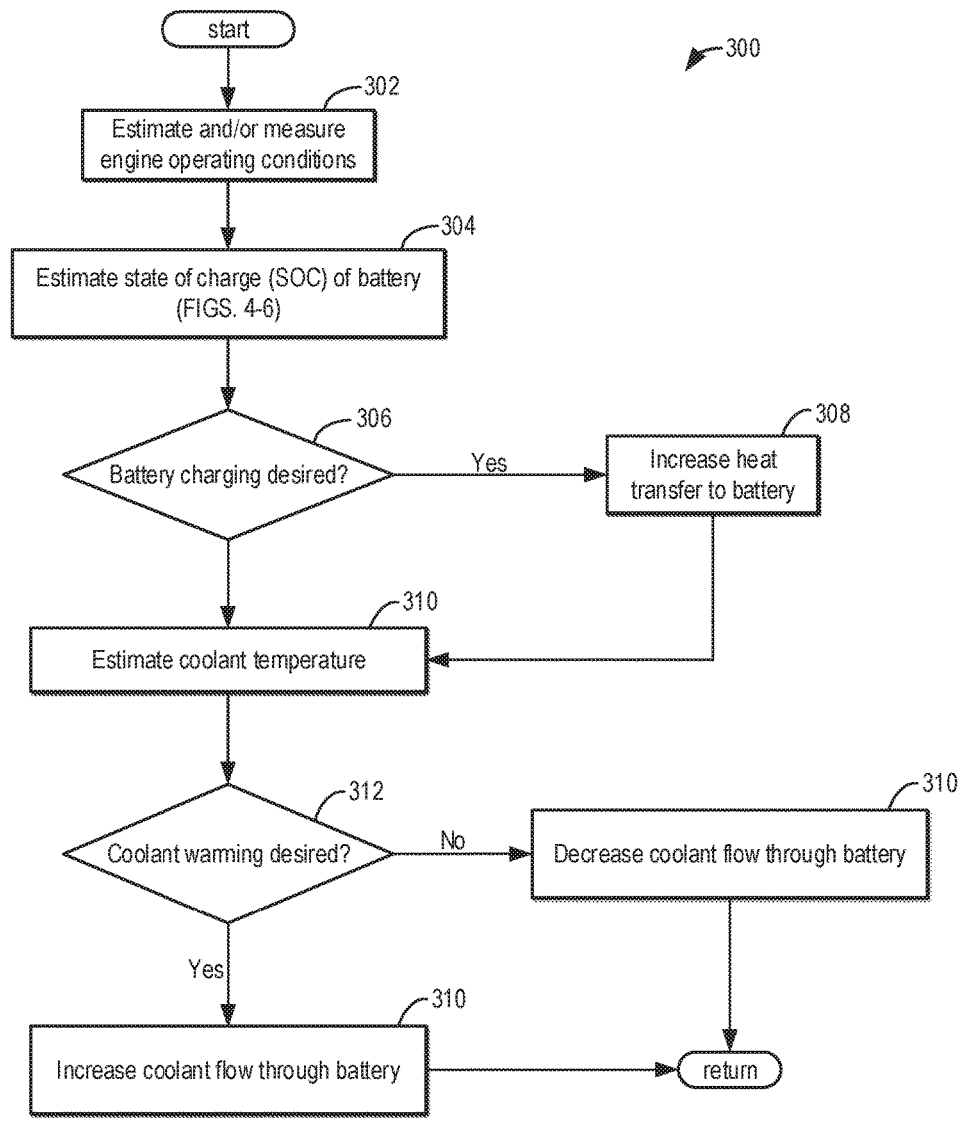
FIG. 3 shows a flow chart of an example method for regulating a state of charge of a thermal storage device.

Focusing first on FIG. 2B, its shows a first schematic 225 of a second embodiment of the battery 202, where the heat absorption tubes 214 may be positioned in a sinuous, stacked configuration. Each of the tubes 214 may be separated by a gap 226, in which cells containing the PCM may be positioned. The heat exchange region 206 may include a first set of cells 218 containing a first PCM 220, and a second set of cells 222 containing a second PCM 224. Although the first set of cells 218 and second set of cells 222 are shown positioned in an alternating order in FIG. 2B, it should be appreciated that other arrangements and/or ordering of the cells 218 and 222 are possible. Further, although an approximately even number of cells 218 and 222 are shown in FIG. 2B, it should be appreciated that the number of cells 218 relative to cells 222 included in the heat exchange region may be altered. As depicted in FIG. 2B, the cells 218 and 222 may be filled with PCM. However, in other examples, any number, or all of the cells 218 and 222 may be only partially filled with PCM. Thus, the amount of PCM included in each of the cells 218 and 222 may be varied.

Further, although the first set of cells 218 are shown in FIG. 2B to only include the first PCM 220 and the second set of cells 222 are shown to only include the second PCM 224, it should be appreciated that the cells 218 and 222 may contain a mixture of the two PCMs 220 and 224 in any relative amounts. Further, the relative amounts of the first and second PCMs 220 and 224 included in the first set of cells 218 may be different than the second set of cells 222. That is the first set of cells 218 and second set of cells 222, may both include the first PCM 220 and second PCM 224, however, the first set of cells 218 may comprise a greater amount of the first PCM 220 relative to the second PCM 224 than the second set of cells 222, or vice versa.

The first PCM 220 and the second PCM 224 may have phase change temperatures that are different by 5° F. In the description herein the phase change temperature may refer to the temperature at which a material changes phase such as between liquid and solid, and/or between liquid and gas, and/or in some examples, between solid and gas. The temperature at which a material changes between a liquid and a gas may be referred to as the vaporization phase change temperature, and the temperature at which a material changes between a liquid and a solid may be referred to as the solidification phase change temperature. However, the difference in the phase change temperatures of the two PCMs 220 and 224 may be in a range between 3-15° F. For example, the first PCM 220 may have a melting temperature of 207° F. and the second PCM 224 may have a melting temperature of 212° F. However, in other examples, the first PCM 220 may have a melting temperature in a range of temperatures between 60° C. and 115° C. Further, the second PCM 224 may have a melting temperature in a range of temperatures between 60° C. and 115° C. However, in some examples, the phase change temperatures of the PCMs 220 and 224 may depend on a concentration of glycal in the PCMs 220 and 224, and/or on ambient pressure. The phase change temperatures of the PCMs 220 and 224 may decrease for increases in altitude and decreases in ambient pressure. Further the phase change temperatures of the PCMs 220 and 224 may increase with increasing concentrations of glycal. As such, the phase change materials may be selected for their phase change temperature at altitude. For example, the phase change temperatures of the PCMs 220 and 224 may be limited to below 90° C. to reduce and/or prevent evaporation of the PCMs 220 and 224 at lower ambient pressures, such as at higher altitudes. Further, the glycal concentration of the PCMs 220 and 224 may be adjusted to change the phase change temperatures of the PCMs. However, in all examples, the phase change temperatures of the two PCMs 220 and 224 may be separated by approximately 3-15° C.

Thus, the phase change temperatures of the first PCM 220 and second PCM 224 may not overlap. Said another way, the temperatures at which the first PCM 220 and second PCM 224 change phase, are different. For example, the first PCM 220 may change phase between a solid and a liquid at a different temperature and/or range of temperatures than the second PCM 224. It is important to note, that in some examples, the phase change temperature of a given PCM may not always be the same, and that the phase change temperature may vary depending on conditions in the thermal battery 202 such as ambient pressure. Specifically, the phase change temperatures of the PCMs 220 and 224 may vary depending on an amount of super saturation and an ambient pressure.

However, the phase change temperatures of the first PCM 220 and second PCM 224 may be sufficiently separated from one another such that the range of temperatures over which the PCM 220 may change phase is different and does not overlap with the range of temperatures over which the PCM 224 may change phase. In this way, the first PCM 220 and second PCM 224 may not change phase simultaneously. That is, the first PCM 220 may not undergo a phase change while the second PCM 224 is undergoing a phase change, and vice versa. As explained above, a phase change may refer to the process in which a material such as PCM changes between a solid and liquid, liquid and gas, and/or solid and gas.

Thus, by selecting PCMs with different phase change temperatures, heat transfer between the two different PCMs may be increased, and as such a more uniform temperature of the thermal battery may be achieved. Said another way, the thermal battery may reach thermal equilibrium more quickly by including two PCMs with different phase change temperatures than in examples where the thermal battery only includes one PCM with a single phase change temperature.

Further, by including the two PCMs with different phase change temperatures, a measurable temperature of the thermal battery 202, may be continuous over the charge states of the thermal battery 202. That is, there may be a distinct measurable temperature for every different state of charge of the battery 202. Said another way, a given measurable temperature of the battery 202, may correspond to a specific state of charge of the battery 202. However, it is important to note that the state of charge of the battery 202 may be additionally determined based on whether the battery is charging or discharging, a rate of change in the temperature of the battery 202, a coolant temperature, etc., as explained in greater detail below with reference to FIGS. 3-5.

For example, when the temperatures of the first PCM 220 and second PCM 224 are below their phase change temperature, and thermal energy is added to the battery 202 during charging of the battery 202, the temperature of the PCMs 220 and 224 may increase. The temperatures of the two PCMs 220 and 224 may continue to increase as thermal energy is added to the battery 202, until the temperature of the first PCM 220 reaches its phase change temperature. Thus, since the first PCM 220 may have a lower phase change temperature than the second PCM 224, the PCM 220 may change phase before the second PCM 224 when charging the battery 202 from a starting temperature below the phase change temperatures of the two PCMs 220 and 224. As the PCMs continue to absorb thermal energy, the temperature of the first PCM 220 may remain approximately the same, as it changes phase. However, the second PCM 224 may continue to increase in temperature depending on the configuration of the battery 202, and chemical properties of the PCMs 220 and 224. For example, when the PCMs are combined to form a mixture, as shown below in the examples of FIGS. 2D and 2E, the PCMs 220 and 224 may warm at approximately the same rate due to nearly instantaneous heat transfer between the two PCMs 220 and 224. Specifically, in examples where the PCMs 220 and 224 are combined together into a mixture, the rate of heat transfer between the PCMs 220 and 224 may be nearly instantaneous and may depend only on diffusion rates, and time for individual molecules and/or elements within the PCMs 220 and 224 to diffuse/orient themselves to their new phase structure (e.g., glass/crystalline structure when changing from liquid to solid). Thus, the second PCM 224 may remain at the phase change temperature of the first PCM 220 when the first PCM 220 undergoes a phase change while heat is added to the battery 202, until the first PCM 220 has completed the phase change. Then, one the first PCM 220 has completed its phase change, both of the PCMs 220 and 224 may continue to increase at a nearly uniform rate as heat is added to the battery 202.

However, in examples where the first and second PCMs 220 and 224 are separated from one another into distinct battery cells 218 and 222 as shown in the examples of FIGS. 2B and 2C, energy may not transfer immediately between the PCMs 220 and 224, and the second PCM 224 may warm above the phase change temperature of the first PCM 220 while the first PCM is undergoing a phase change and energy is being added to the battery 202. Energy from the second PCM 224 may be transferred to the first PCM 220 to warm the first PCM 220 and establish thermal equilibrium in the system. Thus, the warming of the second PCM 224 during the phase change of the first PCM 220 may be limited. However, the rate of heat transfer between the first and second PCMs 220 and 224 may depend on the rates of conduction and/or convention in the battery 202 in examples where the first and second PCMs 220 and 224 are separated from one another into distinct cells. Thus it is important to note, that the thermal battery 202 may not be in thermal equilibrium when the enthalpy of the battery 202 is changing. Specifically, the battery 202 may not be in thermal equilibrium when one of the PCMs 220 and 224 is undergoing a phase change, as the other PCM not undergoing a phase change may continue to change in temperature while the PCM undergoing the phase change may remain at a constant temperature due to delayed heat transfer between the PCMs 220 and 224. As such, the temperatures of the PCMs may be different in such examples, and the battery 202 may not be in thermal equilibrium. It is also important to note that the PCMs even when not undergoing phase changes, may be at different temperatures than one another during charging and/or discharging of the battery 202 due to different molecular properties that may affect the specific heat of the PCMs, and or rates of conduction there-through, etc. Thus, the amount of time for the battery 202 to reach thermal equilibrium may depend on the internal heat transfer rates of the battery 202, such as diffusion rates, molecular alignment rates, latent heat, conduction rates, convection rates, etc., and may also depend on the rate of change of enthalpy in the battery 202 (e.g., the rate of charging and/or discharging).

When the first PCM 220 has completed it phase change, and the battery 202 continues to be charged, one or more of the first and second PCMs 220 and 224 may continue to increase in temperature, and/or the second PCM 224 may begin to change phase. In some examples, the phase change temperature of the second PCM 224 may be such that the second PCM 224 begins its phase change when the first PCM 220 ends its phase change. However, in other examples, the first and second PCM 220 and 224 may continue to increase in temperature after the phase change of the first PCM 220. When the temperature of the second PCM 224 reaches its phase change temperature, it may begin to change phase at a relatively constant temperature. Meanwhile, the first PCM 220 may continue to increase in temperature, assuming it has completed its phase change. Similar to where the first PCM 220 changes phase, if the temperature of the first PCM 220 is higher than the second PCM 224 when the second PCM 224 undergoes its phase change, thermal energy from the first PCM 220 may transfer to the second PCM 224, accelerating the phase change. The reverse is true as the battery 202 is discharged from a fully charged state. The fully charged state may be where both the first and second PCM 220 and 224 are above their phase change temperature. In some examples, the fully charged state may a charge state of the battery 202, where the first and second PCMs 220 and 224 are both in liquid phase. However, in other examples, the fully charged state may a charge state of the battery 202, where the first and second PCMs 220 and 224 are both in gaseous phase.

Thus, by including the two PCMs with different phase change temperatures, the state of charge of the battery 202 may be continuous over a temperature range including the phase change temperatures of the two PCMs 220 and 224. That is, every state of charge of the battery 202 may correspond to a distinct measurable temperature. Thus, the accuracy of estimates of the state of charge of the battery 202 including two PCMs with different phase change temperatures may be increased relative to systems including only one PCM. In systems with only PCM, the state of charge of the battery 202 may be any state of charge in a range of state of charges of the battery at the phase change temperature of the PCM. That is, due to the latent heat of the PCM at its phase change temperature, the state of the charge of the battery 202 may vary at the phase change temperature of the PCM depending on where the PCM is in its phase change.

In some examples, the battery 202 may optionally include a first temperature sensor 230 that may be configured to measure a temperature of the first PCM 220. Specifically, the temperature sensor 230 may be disposed in one of the first set of cells 218, for measuring a temperature of the first PCM 220. Similarly, a second temperature sensor 232 may be included in the battery 202 and may be configured to measure a temperature of the second PCM 224. Specifically, the temperature sensor 232 may be disposed in one of the second set of cells 222 for measuring a temperature of the second PCM 224. The temperature sensors 230 and 232 may be electrically coupled to a controller (e.g., controller 12 shown in FIGS. 1A and 1B), for communicating a measured temperature of the PCMs 220 and 224 to the controller.

Thus in some examples, the controller may estimate a state of charge of the battery 202 based on temperatures of the first and second PCMs 220 and 224. When the temperature of one of the PCMs at its phase change temperature, the state of charge of the battery 202 may be estimated based on the temperature of the other PCM not undergoing a phase change. In this way, a more accurate estimate of the state of charge of the battery 202 may be achieved, since the temperature of the PCM not undergoing the phase change may be different depending on the enthalpy of the PCM undergoing the phase change. More simply, the temperature of the PCM not undergoing the phase change may correlate to a specific enthalpy of the PCM undergoing the phase change, and therefore a state of charge of the battery 202.

However, in other examples, as explained below with reference to FIGS. 3 and 4, the state of charge of the battery 202 may be estimated based on a coolant temperature of coolant exiting the battery 202 via the outlet tube 216, after the battery 202 has reached thermal equilibrium. Thus, when coolant flow in the battery 202 has stopped and/or stagnated for long enough for the coolant, and components of the battery 202 to reach thermal equilibrium, coolant flow may then resume, and a temperature of the stagnated coolant exiting the battery 202 may be estimated based on outputs from the temperature sensor 112. A state of charge of the battery 202 may then be estimated based on the coolant temperature. As such, the temperature of coolant exiting the battery 202 may more accurately reflect the temperature of the battery 202, and therefore the accuracy of estimates of the state of charge of the battery 202 that are obtained based on the temperature of the exiting coolant may be increased.

The PCMs 220 and 224 may comprise any suitable phase change materials. For example, the PCMs 220 and 224 may comprise any one or more of paraffin wax blends, water, bath metals, plain thermals, etc.

Turning now to FIG. 2C, it shows a schematic 250 of a third embodiment of the battery 202, where the coolant flows around the PCMs 220 and 224. The third embodiment of the battery 202 shown in FIG. 2C may be identical to the second embodiment shown in FIG. 2B, except that in FIG. 2C, the heat absorption tubes 214 may be positioned around the PCMs 220 and 224 instead of between the PCMs as shown in FIG. 2B. Specifically, the heat absorption tubes 214 may be positioned around the cells 218 and 222, between the cells 218 and 222 and the insulating layer 203.

Moving on to FIG. 2D, it shows a schematic 275 of a fourth embodiment of the battery 202, where the cells 218 and 222 may be omitted, and the PCMs 220 and 224 may be combined to form a mixture 224. Thus, the fourth embodiment of the battery 202 shown in FIG. 2D may be identical to the embodiment shown in FIG. 2B, except that the PCMs may not be contained in cells and may instead be distributed approximately evenly throughout the heat absorption region 206. The mixture 224 may be included in the heat absorption region 206. In some examples, the mixture 224 may be confined to only a portion of the heat absorption region 206. However, in other examples, as shown in FIG. 2D, the mixture 224 may cover approximately the entire heat absorption region 206. As such, the heat absorption region 206 may be defined by a fluid barrier, which may separate the inside of the absorption region 206 from the outside, and may contain the mixture 224. As explained above with reference to FIG. 2B, the mixture 224, may contain any relative amounts of the two PCMs 220 and 224 (not shown in FIG. 2D). In some examples, the mixture 224 may comprise approximately 75% of the first PCM 220 and 25% of the second PCM 224. However, in other examples, the mixture 224 may comprise approximately 50% of the first PCM 220 and 50% of the second PCM 224. In yet further examples, the mixture 224 may comprise approximately 25% of the first PCM 220 and 75% of the second PCM 224.

However, the relative amounts of the PCMs 220 and 224 may be varied as desired. By varying the relative amounts of the PCMs, the thermal energy storage of the battery 202 may be biased towards a higher or lower temperature. For example, when a greater amount of the first PCM 220 is used than the second PCM 224, a greater amount of latent heat may be available at a lower temperature since the phase change temperature of the first PCM 220 may be lower than that of the second PCM 224. Conversely, when a greater amount of the second PCM 224 is used than the first PCM 220, a greater amount of latent heat may be available at a higher temperature since the phase change temperature of the second PCM 224 may be higher than that of the first PCM 220.

Further, the concentration of the PCMs may be varied throughout the heat absorption region 206. For example, the concentration of the PCMs may increase radially outwards from a center of the battery 202. In other examples, the concentration of the PCMs may decrease radially outwards from the center of the battery 202. However, other patterns or concentration distributions of the PCMs may be utilized, such as Gaussian. Further, the concentration distributions of the two PCMs 220 and 224 may be different and/or independent of one another. However, in other examples the concentration distributions of the two PCMs 220 and 224 may be approximately the same.

Moving on to FIG. 2E, it shows a schematic 290 of a fifth embodiment of the battery 202 that may be identical to the fourth embodiment of the battery 202 shown in FIG. 2D, except that the tubes 214 may be positioned around the mixture 224, similar to that shown in FIG. 2C, instead of within the mixture 224 as shown in FIG. 2D. Thus, the heat absorption tubes 214 may be positioned around a perimeter of the heat absorption region 206, between the heat absorption region 206 and insulating layer 203.

Continuing to FIG. 3, it shows an example method 300 for regulating a state of charge of a thermal battery (e.g., thermal storage device 50 shown in FIGS. 1A and 1B, and thermal battery 202 shown in FIGS. 2A-2E). As explained above with reference to FIG. 1A-2B, the thermal battery may be charged via heat from exhaust gasses flowing through an exhaust passage (e.g., exhaust passage 48 shown in FIGS. 1A and 1B) of an engine (e.g., engine 10 shown in FIGS. 1A and 1B). The thermal energy captured by one or more PCMs of the thermal battery (e.g., PCMs 220 and 224 shown in FIGS. 2B and 2C) may then be transferred to coolant as the coolant flows through the battery. Specifically, as described above with reference to FIG. 1B, one or more of a heat source valve (e.g., valve 120 shown in FIG. 1B), and a heat source pump (e.g., pump 121 shown in FIG. 1B) may be adjusted to regulate an amount of heating/charging of the battery. Too increase an amount of heating of the battery, the valve may be adjusted to a more open position and/or a speed of the pump may be increased.

Coolant flow through the battery may be regulated by adjusting one or more valves. Specifically, a first coolant valve positioned near an inlet of the coolant flow into the battery (e.g., valve 117 shown in FIG. 1B) may be adjusted to a second position to direct coolant from a coolant system (e.g., coolant circuit 102 shown in FIG. 1B) into the battery. As the first coolant valve is adjusted towards an open second position away from a closed first position an amount of coolant directed through the battery may increase. Additionally, in some examples, a second coolant valve may be included near an outlet of the coolant flow out of the battery, and may therefore be adjusted to regulate the amount of coolant flowing out of the battery. Specifically, the second coolant valve may be adjusted between a closed first position, where substantially zero coolant may flow out of the battery and an open second position where coolant flows out of the battery. Thus, in the description of FIGS. 3-6 herein, decreasing coolant flow may be achieved by one or more of adjusting the first coolant valve and/or second coolant valve towards their respective first closed positions. Conversely, increasing coolant flow through the battery may be achieved by one or more of adjusting one or more of the first and second coolant valves towards their respective second open positions. Flowing coolant through the battery may discharge/cool the battery, as the coolant may be at a lower temperature than the battery.

Figure 5:
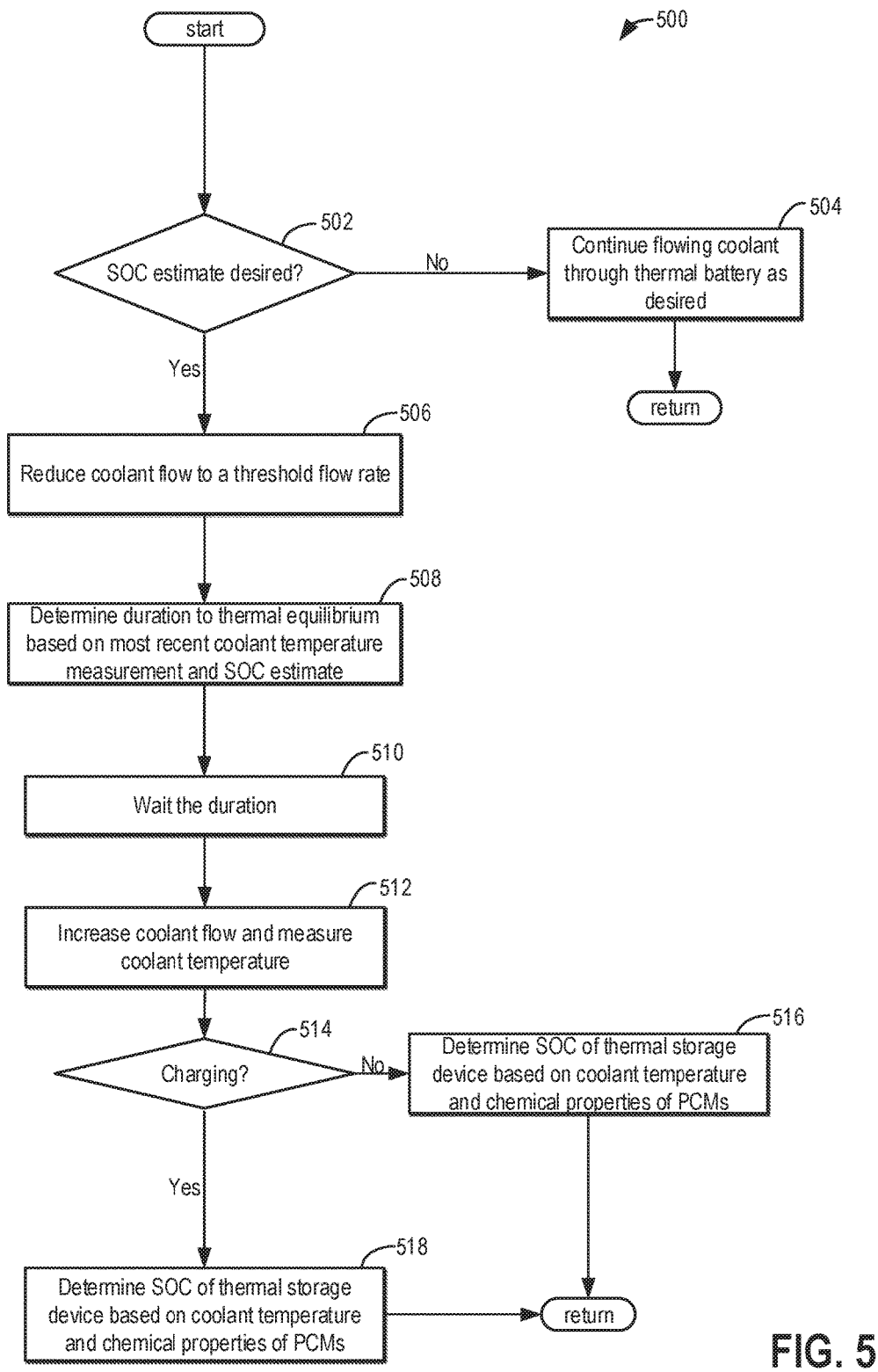
FIG. 5 shows a second example method for determining a state of charge of the thermal storage device.
Figure 6:
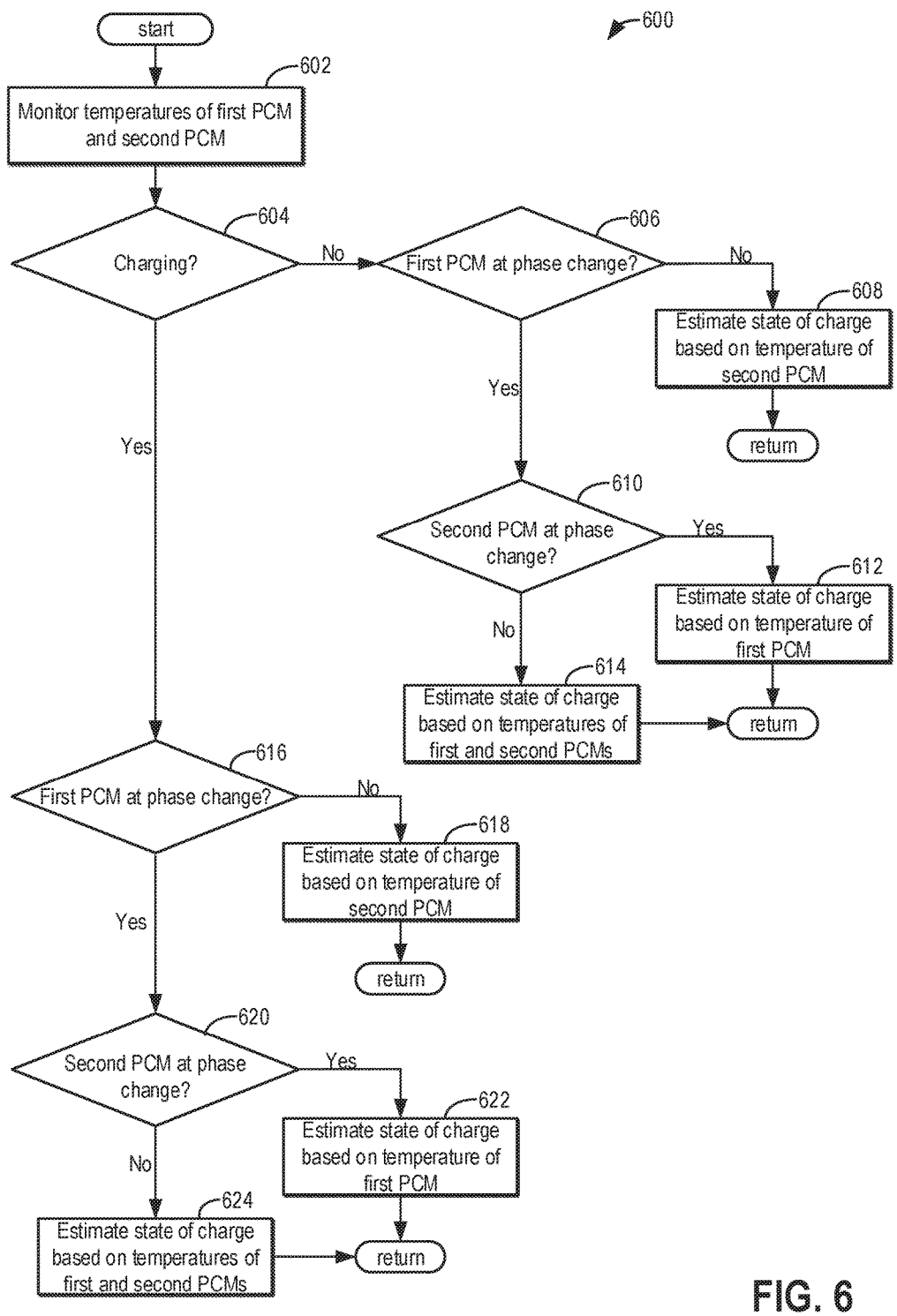
FIG. 6 shows a third example method for determining a state of charge of the thermal storage device.

Instructions for executing method 300 and all other methods described herein with reference to FIGS. 4-6 may be stored in the memory of a controller (e.g., controller 12 shown in FIGS. 1A and 1B). Therefore, method 300 and all other methods described herein may be executed by the controller based on the instructions stored in the memory of the controller and in conjunction with signals received from sensors of the engine system, such as the sensors described above with reference to FIGS. 1A and 1B. The controller may send signals to one or more of the heat source pump, heat source valve, first coolant valve, and second coolant valve to adjust an amount of heating and/or cooling of the battery and coolant.

Method 300 begins at 302 which comprises estimating and/or measuring engine operating conditions. Engine operating conditions may include a coolant temperature, a coolant mass flow, a state of charge of the thermal battery, exhaust gas temperature, a speed of the heat source pump, positions of the one or more valves, etc.

After estimating and/or measuring engine operating conditions at 302, method 300 may proceed to 304 which comprises estimating a state of charge of the battery. Methods for estimating the state of charge of the battery are described below with reference to FIGS. 4-6. In some examples, estimating and/or measuring the state of charge of the battery may comprise stopping coolant flow through the battery and waiting a duration for thermal equilibrium in the battery to be reached between the coolant and the components of the battery as described below with reference to FIG. 5. Then, coolant flow may resume, and a temperature of the stagnant coolant may be measured as it exits the battery. Based on the coolant temperature, a state of charge of the battery may be estimated. However, in other examples, as described below with reference to FIG. 4, the state of charge of the battery may be estimated opportunistically whenever the components of the battery and the coolant have reached thermal equilibrium with one another.

Method 300 may then continue from 304 after estimating the state of charge of the battery to 306, where the method 300 may comprise determining if battery charging is desired. For example, the method 300 at 306 may comprise determining if the state of charge of the battery is below a threshold. The threshold may represent a state of charge of the battery corresponding to a temperature of the battery that is below the phase change temperatures of one or more PCMs included in the battery. Thus, if the state of charge of the battery is less than the threshold, then battery charging may be desired at 306. However, in other examples, determining if battery charging is desired at 306 may be based on one or more of a temperature of exhaust gasses, temperature of coolant, engine cold start conditions, and/or a rate of charging or discharging of the battery. For example, if cabin warming is predicted, and an increase in coolant temperature is therefore expected, the battery may preemptively be charged in anticipation of the cabin warming procedure. In other examples, if exhaust gas temperature is expected to decrease in future driving conditions, the battery may opportunistically be charged while the exhaust gasses are hotter.

If it is determined that battery charging is desired, then method 300 may proceed from 306 to 308, which may comprise increasing heat transfer to the battery. Specifically, the method 300 at 308 may comprise increasing power supplied to the heat source pump, to increase the pump speed, and therefore increase fluid flow and therefore heat transfer, between the exhaust and the battery. Additionally or alternatively, the method 300 at 308 may comprise increasing an opening formed by the heat source valve to increase fluid flow between the exhaust and battery. In this way, an amount of thermal energy transferred from the exhaust to the thermal battery may be increased.

Method 300 may then continue from either 308 or from 306 if it is determined at 306 that battery charging is not desired, to 310, which comprises estimating a temperature of coolant exiting the battery. The temperature of the coolant may be estimated based on outputs from a temperature sensor (e.g., temperature sensor 112 shown in FIGS. 1B-2E) positioned near a coolant outlet of the battery.

After estimating the coolant temperature, the method 300 may then continue from 310 to 312 which may comprise determining if coolant warming is desired. Coolant warming may be desired when the estimated coolant temperature is less than a desired coolant temperature. A desired coolant temperature may be determined based on engine operating conditions, such as engine temperature, cabin temperature, etc. For example, in response to an increase in desired cabin temperature, the desired coolant temperature may increase.

If the coolant temperature is less than desired and coolant warming is desired, method 300 may proceed from 312 to 314 which comprises increasing coolant flow through the battery. As described above, one or more of the first coolant valve and/or second coolant valve may be opened to increase coolant flow through the battery. Due to the increased coolant flow through the battery, the temperature of the coolant may be increased. Further, the rate of warming of the coolant may increase.

However, if at 312 it is determined that coolant warming is not desired, then method 300 may proceed from 312 to 316 which comprises decreasing coolant flow through the battery. As described above, one or more of the first coolant valve and/or second coolant valve may be closed to decrease coolant flow through the battery. Due to the decreased coolant flow through the battery, the temperature of the coolant may be maintained and/or decreased. In some examples, the rate of warming of the coolant may be reduced. In yet further examples, the method 300 at 316 may comprise stopping coolant flow through the battery. In other examples, the method 300 at 316 may comprise maintaining coolant flow at its current flow rate. After executing either 314 or 316, method 300 may then return.

Turning now to the methods shown in FIGS. 4-6, they describe example routines for estimating a state of charge of the battery described above with reference to FIG. 3. Thus, any one or more of the methods described in FIGS. 4-6 may be incorporated and/or executed at 302 of method 300 shown in FIG. 3. FIG. 4 describes an example approach where the state of charge of the battery may opportunistically be estimated whenever coolant flow through the battery has stagnated. Specifically, the state of charge of the battery may be estimated based on a temperature of coolant exiting the battery when coolant flow through the battery resumes. The method described in FIG. 5 provides for an active state of charge estimate, where coolant flow through the battery is temporarily halted, and then allowed to resume. Similar to the method described in FIG. 4, the coolant temperature may be measured as the coolant exits the battery, and a state of charge estimate may be determined based on the coolant temperature. Finally, FIG. 6 describes an approach where temperatures of different PCMs (e.g., PCMs 220 and 224 shown in FIGS. 2B and 2C) in the battery are monitored, and based on changes in the temperature of the PCMs, a state of charge estimate is made.

Focusing now of FIG. 4, the method 400 begins at 402 by determining if the coolant flow rate through the battery is less than a threshold. In some examples, the threshold may be approximately zero. Thus, in some examples, the method 400 at 402 may comprise determining if coolant is not flowing through the battery. However, in other examples, the threshold may be greater than zero. It is important to note that a volume/mass of coolant may be held inside the battery, even while coolant flow through the battery is zero. Thus, when coolant flow through the battery stops, the coolant in the battery may remain in the battery, until coolant flow resumes, and the stagnant coolant exits the battery. Coolant flow rate through the battery may be estimated based on one or more of a position of the first coolant valve, a position of the second coolant valve, and/or a speed of a coolant pump (e.g., pump 133 shown in FIG. 1B).

If the coolant flow rate is not less than the threshold at 402, such as during conditions where coolant warming is desired, method 400 may then return, and an estimate of the state of charge of the battery may not be made. Thus, in some examples, the state of charge of the battery may not be estimated when coolant flow through the battery is greater than the threshold. Said another way, the state of charge of the battery may not be estimated when the coolant and battery have not reached thermal equilibrium and/or components of the battery have not reached thermal equilibrium.

However, in other examples, the method 402 may continue from 402 to optional step 404 which comprises measuring the coolant temperature, even when coolant flow through the battery is greater than the threshold. The coolant temperature may be measured based on outputs from the temperature sensor as described above with reference to 310 of FIG. 3. After estimating the coolant temperature at 404, method 400 may proceed to optional step 406 which comprises estimating the state of charge of the thermal battery based on one or more of the coolant temperature, internal heat transfer within the battery, thermal capacitance of one or more components of the battery and coolant, phase change temperatures of the PCMs, latent heat capacities of the PCMs, and masses of the PCMs. Method 400 then returns.

Returning to 402 if it is determined that the coolant flow rate through the battery is less than the threshold, method 400 may proceed from 402 to 408, which comprises determining a duration to thermal equilibrium of the battery and coolant based on a most recent coolant temperature measurement and a most recent state of charge estimate of the battery. Thus, the method 400 at 408 may comprise determining an amount of time until the battery components and/or coolant in the battery will reach thermal equilibrium, where the temperature of the components of the battery and/or coolant are approximately the same temperature. The time to thermal equilibrium may increase for greater differences in the coolant temperature and the temperature of the battery, greater rates of change in the temperature of the battery, greater differences in temperatures of internal components of the battery, etc. Further, when PCMs included in the battery are above, or below their phase change temperatures, the time to thermal equilibrium may be less than when the PCMs are undergoing a phase change.

After determining the time to thermal equilibrium of the battery and the coolant, method 400 may continue from 408 to 410, which comprises determining if the coolant flow rate has remained below the threshold for the duration of the time to thermal equilibrium. More simply, the method at 410 comprises determining if coolant flow through the battery has stopped for a sufficient amount of time to allow for the coolant and battery components to achieve thermal equilibrium. If the time to thermal equilibrium has not been reached, and therefore the battery components and coolant in the battery are not in thermal equilibrium, then method 400 may continue from 410 to 412 which comprises waiting the duration until thermal equilibrium is reached.

After waiting for the duration to thermal equilibrium, method 400 may then continue from 412 to 414 which comprises determining if the coolant flow rate is less than the threshold in the same or similar manner described above with reference to 402. If the coolant flow rate has increased above the threshold while waiting for thermal equilibrium in the battery to be reached, then method 400 may return from 414, and an estimate of the state of charge of the battery may not be obtained. However, in other examples, method 400 may proceed from 414 to 404 and 406 in the manner described above, if the coolant flow is greater than the threshold after waiting for thermal equilibrium to be reached.

However, if it is determined at 414 that coolant flow remains below the threshold after waiting for thermal equilibrium in the battery to be reached, method 400 may then proceed from 414 to 416 which comprises increasing coolant flow through the battery and measuring the temperature of the coolant in the same or similar manner to that described above with reference to 310 of FIG. 3. Alternatively, if at 410, the time to thermal equilibrium has already expired and the coolant flow is less than the threshold, then method 400 may proceed directly to 416 from 410. Thus, the temperature of the coolant may be taken once the coolant in the battery, and internal components of the battery have reached thermal equilibrium. As described above, in some examples coolant flow may be completely stopped prior to execution of 416. Thus, increasing coolant flow through the battery at 416 may comprise initiating coolant flow through the battery, for example by adjusting one or more of the first and second coolant valves away from closed positions.

After increasing coolant flow through the battery at 416, method 400 may continue to 418 which comprises determining if the battery is charging. Said another way, the method 400 at 418 may comprise determining if the enthalpy of the battery is increasing and/or the temperature of the battery is increasing. Determining whether the battery is charging may be based on a most recent of most recent set of temperatures and/or state of charge estimates for the battery. Based on the trend in temperatures and/or state of charge of the battery, it may be determined if the battery is charging or discharging. However, in other examples, determining if the battery is charging or discharging may be based on be based on one or more of a position of the heat source valve, a speed of the heat source pump, and positions of one or more of the first coolant valve and second coolant valve. For example, if one or more of the first coolant valve and second coolant valve are closed, and coolant is not circulating through the battery, and the heat source pump is on and the heat source valve is open, then the enthalpy of the battery may be increasing due to the thermal energy being absorbed from exhaust gasses by internal components of the battery, and as such it may be determined that the battery is charging. Conversely, if the heat source pump is off, and/or the heat source valve is closed, and coolant is circulating through the battery, it may be determined that the battery is discharging.

If it is determined at 418 that the battery is not charging (e.g., discharging), then method 400 may continue from 418 to 420 which comprises determining the state of charge of the thermal battery based on the coolant temperature and one or more chemical properties of the two PCMs. The chemical properties may include one or more of internal heat transfer rates, diffusion rates, time to molecular alignment, specific heat, phase change temperatures of the PCMs, latent heat capacities of the PCMs, masses of the PCMs, ambient pressure, altitude, and coolant system pressure. Additionally, a first transfer function may be applied to the input received from the temperature sensor, and may convert the coolant temperature estimate received from the sensor to an estimate of the state of charge of the battery. The first transfer function may be a non-linear transfer function that relates the temperature of the coolant to a state of charge of the battery. Thus, the controller may use a look-up table to convert the coolant temperature reading (e.g., inputs received from the temperature sensor) to a state of charge estimate based on the first transfer function. However, in other examples, the first transfer function may be a linear transfer function. The first transfer function may correspond to a known relationship between coolant temperatures and states of charge of the battery while the battery is discharging.

However, if it is determined at 418 that the battery is charging, then method 400 may continue from 418 to 422 which comprises determining the state of charge of the battery based on the measured coolant temperature and one or more chemical properties of the two PCMs. The chemical properties may include one or more of internal heat transfer rates, diffusion rates, time to molecular alignment, specific heat, phase change temperatures of the PCMs, latent heat capacities of the PCMs, and masses of the PCMs, ambient pressure, altitude, and coolant system pressure. Additionally, a second transfer function may be applied to the input received from the temperature sensor, and may convert the coolant temperature estimate to an estimate of the state of charge. The second transfer function may be a non-linear transfer function. However, in other examples the second transfer function may be a linear transfer function. The second transfer function may be different than the first transfer function. Specifically, the second transfer function may convert coolant temperatures (e.g., inputs received from the temperature sensor) to a state of charge for the battery along a known charging curve. That is, the state of charge of the battery for a given coolant temperature may be different depending on whether the battery is charging or discharging. Thus, a different transfer function may be used to determine the state of charge of the battery when the battery is charging than when the battery is discharging. Method 400 may then return from either 420 or 422.

Turning now to FIG. 5, it shows a second example method 500 for determining the state of charge of the battery described above with reference to FIG. 3. However, in the method 500, coolant flow may be actively stopped for a duration until the battery and coolant reach thermal equilibrium, and then coolant flow through the battery may resume, and a temperature measurement of the coolant may be taken and used to infer a state of charge of the battery.

Method 500 begins at 502 which comprises determining if it is desired to estimate the state of charge of the thermal battery. For example, it may be desired to determine the state of charge of the battery when more than a threshold duration has passed since the most recent state of charge estimate. Thus, estimates of the state of charge of the battery may be performed at regular intervals. However, in further examples the rate at which the state of charge of the battery is estimated may be based on one or more of the state of charge of the battery, the temperature of the coolant, the rate of charging and/or discharging of the battery, exhaust gas temperature, changes in desired coolant temperature, etc. In other examples, it may be desired to estimate the state of charge of the battery when the desired coolant temperature changes, and/or when exhaust gas temperatures change by more than a threshold, etc.

If it is determined at 502 that a state of charge estimate of the battery is not desired, then method 500 may continue from 502 to 504 which comprises continuing to flow coolant through the thermal battery as desired to achieve the desired coolant temperature. Method 500 may then return.

However, if it is determined at 502 that a state of charge estimate is desired for the battery, then method 500 may proceed from 502 to 506 which comprises reducing coolant flow through the battery to a threshold flow rate. In some examples, the threshold flow rate may be approximately zero. Thus, the method 500 at 506 may comprise stopping coolant flow through the battery. However, in other examples, the threshold flow rate at 506 may be greater than zero.

After reducing coolant flow through the battery to the threshold flow rate at 506, method 500 may continue from 506 to 508 which comprises determining the duration to thermal equilibrium of the battery and coolant in the battery based on a most recent coolant temperature measurement and/or a state of charge estimate of the battery, in the same or similar manner described above with reference to 408 in FIG. 4. Thus, the method at 506 may comprise determining an amount of time to continue to halt coolant flow through the battery.

Method 500 may then continue to 510 from 508, where the method at 510 may comprise waiting the duration. Thus, the method at 500 may comprise continuing to prevent coolant flow through the battery for the duration. More simply the method 500 at 510 may comprise stagnating coolant in the thermal battery until the coolant and components of the thermal battery reach thermal equilibrium. Specifically, the method 500 at 510 may comprise adjusting one or more of the first coolant valve and/or second coolant valve to their respective closed first positions. In this way, the method 500 at 510 may comprise stopping coolant flow through the battery for the duration.

After waiting the duration at 510, method 500 may then continue to 512 which comprises increasing coolant flow through the battery and measuring a temperature of the coolant as it exits the battery in the same or similar manner to that described above with reference to 416 in FIG. 4.

Method 500 may then continue from 512 to 514 after measuring coolant temperature as it exits the thermal battery, where the method 500 at 514 comprises determining if the battery is charging in the same or similar manner to that previously described above with reference to 418 in FIG. 4. If the battery is not charging, then method 500 may continue from 514 to 516 which comprises determining the state of charge of the battery based on the measured coolant temperature and one or more chemical properties of the PCMs, in the same or similar manner to that described above with reference to 420 in FIG. 4. However, if the battery is charging, then method 500 may continue from 514 to 518 which comprises determining the state of charge of the battery based on the measured coolant temperature and one or more chemical properties of the PCMs in the same or similar manner to that described above with reference to 422 in FIG. 4. Method 500 may then return from either 516 or 518.

Turning now to FIG. 6, it shows a third example method 600 for determining the state of charge of the battery described above with reference to FIG. 3 when a first PCM (e.g., PCM 220 shown in FIGS. 2B and 2C) and second PCM (PCM 224 shown in FIGS. 2B and 2C) with different phase change temperatures are separated from one another in distinct battery cells (e.g., cells 218 and 222 shown in FIGS. 2B and 2C) in the battery. In the method 600, a state of charge of the battery may be estimated based on changes in the temperature of one or more PCMs. Specifically, when one of either the first PCM or the second PCM is undergoing a phase change, the temperature of the PCM not undergoing the phase change may be used to estimate a state of charge of the battery. Since the PCMs may be separated from one another into distinct cells, heat transfer between the PCMs may not be instantaneous. As such, when one of the PCMs is undergoing a phase change at an approximately constant temperature, the other PCM may continue to change temperature. Based on the temperature of the PCM not undergoing the phase, an estimate of the enthalpy level of the PCM undergoing the phase change may be obtained, and therefore a more accurate measurement of the state of charge of the battery may be made.

Method 600 may begin at 602 which comprises monitoring the temperatures of the first and second PCMs. In some examples, the temperatures of the first and second PCMs may be monitored via outputs from PCM temperature sensors (e.g., temperature sensors 230 and 232 shown in FIGS. 2B and 2C) positioned in the battery cells containing the PCMs. In such examples, it is important to note that the temperatures of the PCMs may continuously be monitored, and as such, the controller may execute 602 while executing the rest of method 600. In other examples, the temperatures of the first and second PCMs may be estimates based on outputs from a coolant outlet temperature sensor (e.g., temperatures sensor 112 shown in FIGS. 2A-2E) positioned in a coolant outlet.

From 602, method 600 may proceed to 604 which comprises determining if the battery is charging in the same or similar manner to that described above with reference to 418 shown in FIG. 4. However, in other examples, the method 600 at 604 may comprise determining if the battery is charging based on temperature changes in one or more of the PCMs. Thus, if the temperatures of one or more of the PCMs are decreasing, then it may be determined that the battery is discharging. However, if the temperatures of one or more of the PCMs are increasing then it may be determined at 604 that the battery is charging.

If the battery is charging at 604, method 600 may continue from 604 to 606 which comprises determining if the first PCM is at its phase change temperature. Thus, the method 600 at 606 may comprise determining if the first PCM is undergoing a phase change based on the temperature of the first PCM and a known phase change temperature of the first PCM. If the temperature of the first PCM is approximately the same as its phase change temperature, then it may be determined at 606 that the PCM is undergoing a phase change.

If it is determined that the first PCM is at its phase change temperature at 606, then method 600 may continue from 606 to 608 which comprises estimating a state of charge of the battery based on the temperature of the second PCM, one or more chemical properties of the PCMs, heat transfer within the battery including conduction and/or convention rates, and a first transfer function. The first transfer function may in some examples be a non-linear transfer function. However, in other examples, the first transfer function may be a linear transfer function. The first transfer function may convert the input of the second PCM temperature measurement to an output corresponding to an estimate of the state of charge of the battery. Method 600 then returns.

However, if it is determined at 606 that the first PCM is not at its phase change temperature, then method 600 may proceed from 606 to 610 which comprises determining if the second PCM is at its phase change temperature. Thus, the method 600 at 610 may comprise determining if the second PCM is undergoing a phase change based on the temperature of the second PCM and a known phase change temperature of the second PCM. If the temperature of the second PCM is approximately the same as its phase change temperature, then it may be determined at 610 that the second PCM is undergoing a phase change.

If it is determined that the second PCM is at its phase change temperature at 610, then method 600 may continue from 610 to 612 which comprises estimating a state of charge of the battery based on the temperature of the first PCM, one or more chemical properties of the PCMs, heat transfer within the battery including conduction and/or convention rates, and a second transfer function. The second transfer function may in some examples be a non-linear transfer function. However, in other examples, the second transfer function may be a linear transfer function. The second transfer function may convert the input of the first PCM temperature measurement to an output corresponding to an estimate of the state of charge of the battery. Method 600 then returns.

However, if it is determined at 610 that the temperature of the second PCM is not at its phase change temperature, then method 600 may continue to 614 which comprises determining a state of charge of the battery based on the temperatures of the first PCM and second PCM, one or more chemical properties of the PCMs, heat transfer within the battery including conduction and/or convention rates, and a third transfer function. Said another way, based on the temperatures of the first and second PCMs, the controller may determine the state of charge of the battery based on a look-up table relating states of charge of the battery to PCM temperatures when the battery is charging. Method 600 may then return.

Returning to 604, if it is determined that the battery is discharging, method 600 may continue from 604 to 616 which comprises determining if the first PCM is at its phase change temperature in the same or similar manner to that described above at 606.

If it is determined at 616 that the first PCM is at its phase change temperature, then method 600 may continue from 616 to 618 which comprises estimating a state of charge of the battery based on the temperature of the second PCM, one or more chemical properties of the PCMs, heat transfer within the battery including conduction and/or convention rates, and a fourth transfer function. Method 600 then returns.

However, if it is determined at 616 that the first PCM is not at its phase change temperature, then method 600 may proceed from 616 to 620 which comprises determining if the second PCM is at its phase change temperature in the same or similar manner to that described above at 610.

If it is determined that the second PCM is at its phase change temperature at 620, then method 600 may continue from 620 to 622 which comprises estimating a state of charge of the battery based on the temperature of the first PCM, one or more chemical properties of the PCMs, heat transfer within the battery including conduction and/or convention rates, and a fifth transfer function. Method 600 then returns.

However, if it is determined at 620 that the temperature of the second PCM is not at its phase change temperature, then method 600 may continue to 624 which comprises determining a state of charge of the battery based on the temperatures of the first PCM and second PCM, one or more chemical properties of the PCMs, heat transfer within the battery including conduction and/or convention rates and a sixth transfer function. Said another way, based on the temperatures of the first and second PCMs, the controller may determine the state of charge of the battery based on a look-up table relating states of charge of the battery to PCM temperatures when the battery is discharging. Method 600 may then return.

Turning now to FIG. 7, it shows a graph 700 depicting changes in coolant flow through a thermal battery (e.g., battery 202 shown in FIGS. 2A-2E) during varying engine operating conditions. Specifically, changes in coolant flow through the battery are shown at plot 702. As described above with reference to FIGS. 1B and 3-6, coolant flow through the battery may be adjusted by adjusting the position of one or more valve positioned near a coolant inlet and/or coolant outlet of the battery. Further, the coolant flow rate through the battery may be estimated based on the positions of one or both of the coolant valves. The state of charge of the battery is shown at plot 504. Estimates of the state of charge of the battery may be obtained based on a temperature of the coolant taken proximate a coolant outlet of the battery as the coolant exits the battery. A position of a heat source valve (e.g., valve 120 shown in FIG. 1B) is shown at plot 506. The heat source valve may be opened to circulate a fluid between an exhaust passage (e.g., exhaust passage 48 shown in FIGS. 1A and 1B) and the thermal battery for transferring thermal energy from the warmer exhaust gasses to the cooler thermal battery. Specifically, the heat source valve may be adjusted between a closed first position, where approximately no fluid flows there-through and thus, substantially no heat is transferred to the thermal battery, and an open second position where fluid flows through the valve and thus, heat is added to the thermal battery. Plot 508 depicts a difference in temperature between the coolant in the battery, and a temperature of one or more PCMs (e.g., PCMs 220 and 224 shown in FIGS. 2B and 2C) included in the battery.

Beginning before $t_1$, coolant may be flowing through the battery, and the heat source valve may be closed. As such, the state of charge of the battery may be decreasing, as the coolant may draw thermal energy from the battery as the coolant flows through the battery. Further, the coolant may be at a substantially different temperature than the PCM of the battery.

At $t_1$, a state of charge estimate of the battery may be desired, and as such, coolant flow through the battery may be stopped. Thus, coolant flow at $t_1$, may be reduced to approximately zero. As such, the state of charge of the battery may begin to level off and/or stop discharging. The heat source valve may remain closed, and the difference in temperature of the coolant and PCM may continue to decrease.

Between $t_1$ and $t_2$, coolant flow through the battery may remain stagnant, and the state of charge of the battery may remain approximately the same. Further, the heat source valve may remain closed, and the difference in temperature between the coolant and PCM may continue to decrease. At $t_2$, the difference in temperature between the coolant and PCM may reach a threshold 709. The threshold 709 may in some examples be approximately zero, and thus may represent conditions where the coolant temperature of coolant in the thermal battery, and the temperature of the PCM of the battery are approximately the same. Thus, the threshold 709 may represent thermal equilibrium of internal battery components and the coolant in the battery. However, in other examples, the threshold 709 may be greater than zero.

Thus, at $t_2$ when thermal equilibrium has been reached within the battery, coolant flow through the battery may be turned back on by opening one or more of the coolant valves. As the coolant that has reached thermal equilibrium with the internal battery components leaves the battery at $t_2$, a temperature of the coolant may be measured via a temperature sensor (e.g., temperature sensor 112 shown in FIGS. 1B-2E), and a state of charge of the battery may be estimated based on the coolant temperature as it exits the battery. The heat source valve may remain closed at $t_2$.

Between $t_2$ and $t_3$, coolant may continue to flow through the battery, and thus the state of charge of the battery may decrease. The heat source valve may remain closed, and the temperature difference between the coolant and the PCM may initially increase, as coolant flow through the battery resumes, and may begin to decrease, as coolant warms to the temperature of the battery. At $t_3$, the coolant temperature may reach a desired coolant temperature, and therefore coolant flow through the battery may no longer be desired.

Thus, coolant flow may be turned off at $t_3$, and as such, the battery may stop discharging at $t_3$. The heat source valve may remain closed at $t_3$, and the coolant in the battery may continue to warm to the temperature of the PCM in the battery. Between, $t_3$ and $t_4$, coolant warming by the thermal battery may continue to not be desired. The difference in temperature between the coolant and the battery may continue to decrease, as the stagnant coolant in the battery may reach thermal equilibrium with the battery. Thus, the temperature of the coolant may reach approximately the same temperature as the PCM in the battery between $t_3$ and $t_4$. The heat source valve may remain closed, and thus the state of charge of the battery may remain relatively constant.

At $t_4$, warming of the coolant by the thermal battery may be desired, and as such coolant flow through the battery may resume. Since the coolant in the battery reaches thermal equilibrium with the battery between $t_3$ and $t_4$, an estimate of the state of charge of the battery may be made at $t_4$ based on the coolant temperature as it exits the battery, in response to coolant flow through the battery resuming. The heat source valve may remain closed at $t_4$.

Between $t_4$ and $t_5$, coolant may continue to flow through the battery, and thus the state of charge of the battery may decrease. The heat source valve may remain closed, and the temperature difference between the coolant and the PCM may initially increase, as coolant flow through the battery resumes, and may begin to decrease, as coolant warms to the temperature of the battery. At $t_5$, an estimate of the state of charge of the battery may be desired, and as such, coolant flow through the battery may be stopped at $t_5$. The heat source valve may remain closed at $t_5$, and the difference in temperature between the coolant and the battery may decrease, as the coolant in the battery may be warmed by the battery.

Between, $t_5$ and $t_6$, coolant flow through the battery may remain off. The difference in temperature between the coolant and the battery may continue to decrease, as the stagnant coolant in the battery may reach thermal equilibrium with the battery. Thus, the temperature of the coolant may reach approximately the same temperature as the PCM in the battery between $t_5$ and $t_6$. The heat source valve may remain closed, and thus the state of charge of the battery may remain relatively constant.

At $t_6$, coolant flow may through the battery may resume in response to the coolant in the battery reaching thermal equilibrium with the battery. As the coolant flows out of the battery, a temperature of the coolant may be measured, and an estimate of the state of charge of the battery may be determined. The state of charge of the battery may decrease below a threshold state of charge 705. In response to the estimated state of charge decreasing below the threshold 705 at $t_6$, the heat source valve may be opened at $t_6$, to transfer heat from the exhaust gasses to the battery, and therefore charge the battery. Thus, battery charging may be initiated at $t_6$.

Between $t_6$ and $t_7$, coolant warming by the thermal battery may be desired, and as such coolant flow through the battery may continue. The temperature difference between the coolant and the PCM may initially increase, as coolant flow through the battery resumes, and may then decrease, as coolant warms to the temperature of the battery. The heat source valve may remain open between $t_6$ and $t_7$, and the state of charge of the battery may therefore increase. However, since coolant is still flowing through the battery between $t_6$ and $t_7$, the battery may charge at a lower first rate between $t_6$ and $t_7$.

At $t_7$, coolant warming by the thermal battery may no longer be desired, and as such, coolant flow through the battery may stop. The heat source valve may remain open, and due to the cessation of coolant flow through the battery at $t_7$, the battery may begin to charge at a higher second rate. The temperature difference between the coolant and the battery may continue to decrease, as the stagnant coolant in the battery is warmed by the battery. Warming of the coolant may be enhanced due to the charging of the battery.

Between $t_7$ and $t_8$, the state of charge of the battery may continue to increase at the higher second rate. The heat source valve therefore remains open, and the temperature difference between the coolant and the PCM may continue to decrease. Coolant flow remains off between $t_7$ and $t_8$.

At $t_8$, the battery may reach a fully charged state of charge, and in response to the battery reaching a fully charged state, the heat source valve may be closed. Thus, charging of the battery may be stopped at $t_8$. Further, in response to increased desired coolant temperature at $t_8$, coolant flow through the battery may resume. The temperature difference between the coolant and the PCM may initially increase, as coolant flow through the battery resumes, and may then decrease, as coolant warms to the temperature of the battery.

After $t_8$, coolant may continue to flow through the battery, the heat source valve may remain closed, and thus, the state of charge of the battery may decrease from the fully charged state. As the coolant is warmed, the difference in temperature between the coolant and PCM may decrease.

Thus, a thermal battery may comprise two phase change materials with different phase change temperatures. When coolant included in the thermal battery and the PCMs reach thermal equilibrium, a temperature of coolant exiting the battery may be measured, and a state of charge of the battery may be estimated based on the measured coolant temperature. Specifically, coolant flow through the battery may be temporarily stopped until coolant in the battery stagnates, and both internal components of the battery and the coolant within the battery reach thermal equilibrium. Then, coolant flow may resume, and a temperature of the stagnated coolant may be measured as it exits the battery. Based on the coolant temperature an estimate of the state of charge of the battery may be obtained.

In this way, a technical effect of increasing the accuracy of estimates of the state of charge of a thermal battery may be achieved, by stopping coolant flow through the battery, until thermal equilibrium within the battery is reached, and then resuming coolant flow and measuring a temperature of the coolant as it exits the battery. In this way, the temperature of the coolant exiting the battery may more closely match the actual temperature of the battery. Thus, differences between the coolant temperature and the battery may be reduced. As such, the accuracy of estimates of the state of charge of the battery that are based on the temperature of coolant exiting the battery, may be increased. By increasing the accuracy of estimates of the state of charge of the battery, heating efficiency, and therefore fuel economy may be increased.

In one example, a method may comprise estimating a temperature of a thermal battery after the battery and coolant included therein have reached thermal equilibrium, and determining a state of charge of the battery based on the estimated temperature and one of a first and second transfer functions. Additionally or alternatively, the temperature of the thermal battery may be estimated based on outputs from a temperature sensor coupled to a coolant outlet of the battery, where the sensor may be configured to measure a temperature of coolant exiting the battery. In any of the above methods or combination of methods, determining the state of charge of the battery may be based on the estimated temperature and the first transfer function when the battery is charging. In any of the above methods, the determining the state of charge of the battery may be based on the estimated temperature and the second transfer function when the battery is discharging. Any of the above methods or combination of methods may further comprise, stopping coolant flow through the thermal battery until the thermal battery and coolant included therein have reached thermal equilibrium, prior to estimating the temperature of the thermal battery. In any of the above methods or combination of methods, the stopping the coolant flow through the thermal battery may comprise adjusting a coolant valve to a first position to bypass coolant around the thermal battery. Any of the above methods or combination of methods may further comprise, resuming coolant flow through the thermal battery after the thermal battery and coolant included therein have reached thermal equilibrium. Further, the resuming coolant flow through the thermal battery comprising adjusting a coolant valve away from a first position to circulate coolant through the thermal battery.

In another representation, a thermal battery system may comprise a thermal storage device including a first phase change material having a first phase change temperature and a second phase change material having a second, different phase change temperature, a coolant valve adjustable between a first position and a second position to selectively couple the thermal storage device to an engine coolant circuit and regulate an amount of coolant circulating through the thermal storage device, a temperature sensor for estimating a temperature of the device, and a controller with non-transitory computer readable instructions for: estimating a temperature of the device when coolant within the device has stopped for more than a threshold duration, and determining a state of charge of the battery system based on the estimated temperature and one of a first and second transfer functions. In some examples, the first and second phase change materials may be combined together in a mixture. Additionally or alternatively, the mixture may comprise more of one of the phase change materials than the other. However, in other examples, the first and second phase change materials may be separated from one another into distinct battery cells. Any of the above systems or combination of system may further comprise a heat exchange loop, the heat exchange loop disposed at least partially within an exhaust passage of an engine system and at least partially within the thermal storage device, the heat exchange loop comprising coolant, circulating therethrough, for transferring thermal energy from the exhaust passage to the thermal storage device. In any of the above systems or combination of systems, the controller may further be configured with instructions stored in memory for: in response to a request for an estimate of the state of charge of the device, stopping coolant flow through the device for a duration, resuming coolant flow after waiting the duration, and estimating a state of charge of the battery based on a temperature of the coolant as it exits the device via output from a temperature sensor positioned near a coolant outlet of the device. In any of the above systems or combination of systems, the duration may be an amount of time for coolant included within the device, and internal components of the device including the phase change materials, to reach thermal equilibrium, and where the duration may be calculated based on a most recent coolant temperature measurement and a most recent state of charge estimate of the battery.

In yet another representation, a method for an engine cooling system may comprise stopping coolant flow through a thermal storage device comprising two phase change materials with different melting points for a duration, resuming coolant flow through the thermal storage device after the duration and estimating a temperature of coolant exiting the thermal storage device based on outputs from a temperature sensor positioned proximate a coolant outlet of the device, and calculating a state of charge of the device based on the estimated coolant temperature and one of a first and second transfer functions. Additionally, the duration may comprise an amount of time for coolant included within the device and internal components of the device including the phase change materials, to reach thermal equilibrium, and where the duration may be calculated based on a most recent coolant temperature measurement and a most recent state of charge estimate of the battery. In any of the above methods or combination of methods, the calculating the state of charge of the device may be based on the estimated coolant temperature and the first transfer function when the device is charging. In any of the above methods or combination of methods, the calculating the state of charge of the device may be based on the estimated coolant temperature and the second transfer function when the device is discharging. Any of the above methods or combination of methods may further comprise estimating a state of charge of the device when the device and/or coolant included within the device are not in thermal equilibrium based on one or more of a temperature of the coolant as it exits the device, a third transfer function, internal heat transfer within the device, phase change temperatures of the phase change materials, latent heat capacities of the phase change materials, masses of the phase change materials, ambient pressure, altitude, and coolant system pressure.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a thermal storage device of an engine cooling system, comprising:
   flowing each of a coolant and a second fluid through the thermal storage device via separate tubes, the second fluid heated from exhaust gases of an engine;
   stopping the coolant flow through the thermal storage device, the thermal storage device comprising two phase change materials with different melting points, for a duration;
   resuming coolant flow through the thermal storage device after the duration and estimating a temperature of coolant exiting the thermal storage device based on outputs from a temperature sensor positioned at a coolant outlet of the thermal storage device; and
   calculating a state of charge of the thermal storage device based on the estimated coolant temperature and one or more chemical properties of the phase change materials, the thermal storage device adapted to charge via receiving thermal energy from the heated second fluid and discharge via transfer of thermal energy to the coolant.

2. The method of claim 1, wherein the stopping the coolant flow is responsive to a desire to estimate the state of charge of the thermal storage device, wherein the duration comprises an amount of time for coolant included within the thermal storage device and internal components of the thermal storage device including the phase change materials, to reach thermal equilibrium, and wherein the duration is calculated based on a most recent coolant temperature measurement and a most recent state of charge estimate of the thermal storage device.

3. The method of claim 1, wherein the calculating the state of charge of the thermal storage device is based on the estimated coolant temperature and a first transfer function when the thermal storage device is charging, the first transfer function corresponding to a known relationship between coolant temperature and the state of charge of the thermal storage device while the thermal storage device is charging, and wherein the calculating the state of charge of the thermal storage device is executed via a controller according to computer readable instructions stored in non-transitory memory of the controller.

4. The method of claim 1, wherein the calculating the state of charge of the thermal storage device is based on the estimated coolant temperature and a second transfer function when the thermal storage device is discharging, the second transfer function corresponding to a known relationship between the coolant temperature and the state of charge of the thermal storage device while the thermal storage device is discharging, and further comprising, while flowing the coolant through the thermal storage device, adjusting the coolant flow based on a desired coolant temperature, the desired coolant temperature based on engine operating conditions of the engine.

5. The method of claim 1, further comprising estimating the state of charge of the thermal storage device when the thermal storage device and/or coolant included within the thermal storage device are not in thermal equilibrium based on one or more of a temperature of the coolant as it exits the thermal storage device, a third transfer function, internal heat transfer within the thermal storage device, phase change temperatures of the phase change materials, latent heat capacities of the phase change materials, masses of the phase change materials, ambient pressure, altitude, and coolant system pressure.

* * * * *